United States Patent
Miyajima et al.

[11] Patent Number: 5,984,219
[45] Date of Patent: *Nov. 16, 1999

[54] FISHLINE GUIDE ARRANGEMENT FOR SPINNING REEL

[75] Inventors: Masamitsu Miyajima; Yukio Ito; Kyoichi Kaneko; Takashi Shibata; Wataru Tsutsumi; Eiji Shinohara; Shinji Takeuchi, all of Tokyo, Japan

[73] Assignee: Daiwa Seiko, Inc., Tokyo, Japan

[*] Notice: This patent is subject to a terminal disclaimer.

[21] Appl. No.: 08/896,018

[22] Filed: Jul. 17, 1997

Related U.S. Application Data

[63] Continuation of application No. 08/550,934, Oct. 31, 1995, Pat. No. 5,855,327.

[30] Foreign Application Priority Data

| Oct. 31, 1994 | [JP] | Japan | 6-267513 |
| Apr. 14, 1995 | [JP] | Japan | 7-113775 |
| May 2, 1995 | [JP] | Japan | 7-166764 |

[51] Int. Cl.$^6$ ................................. A01K 89/01
[52] U.S. Cl. .......................... 242/231; D22/141
[58] Field of Search ................... 242/230, 231, 242/232, 233

[56] References Cited

U.S. PATENT DOCUMENTS

| D. 369,644 | 5/1996 | Kaneko et al. | D22/141 |
| D. 369,849 | 5/1996 | Kaneko et al. | |
| D. 372,514 | 8/1996 | Kaneko et al. | |
| D. 372,758 | 8/1996 | Kaneko et al. | |
| D. 374,705 | 10/1996 | Kaneko et al. | |
| D. 374,909 | 10/1996 | Kaneko et al. | D22/141 |
| D. 377,386 | 1/1997 | Yamaguchi | D22/141 |
| D. 384,727 | 10/1997 | Yamaguchi | D22/141 |

(List continued on next page.)

FOREIGN PATENT DOCUMENTS

| 1252667 | 12/1960 | France . |
| 1299685 | 12/1962 | France . |
| 30-5881 | 4/1955 | Japan . |
| 53-38582 | 4/1978 | Japan . |
| 53-122584 | 10/1978 | Japan . |
| 60-10381 | 4/1985 | Japan . |
| 3-17661 | 4/1991 | Japan . |
| 3-79660 | 8/1991 | Japan . |
| 4-77771 | 7/1992 | Japan . |
| 6-46467 | 6/1994 | Japan . |
| 94-4769 | 3/1994 | Rep. of Korea . |
| 94-8260 | 12/1994 | Rep. of Korea . |
| 244530 | 5/1947 | Switzerland . |
| 354960 | 8/1931 | United Kingdom . |

OTHER PUBLICATIONS

User's Manual for Shimano Wide Power Roller and translation thereof, with Sample Product and photograph of Wide Power Roller.
User's Manual for Shimano Narrow Power Roller and translation thereof, with photograph of Narrow Power Roller.

*Primary Examiner*—Katherine A. Matecki
*Attorney, Agent, or Firm*—Sughrue, Mion, Zinn Macpeak & Seas, PLLC

[57] ABSTRACT

In a spinning reel for fishing, a fishline guide roller is rotatably supported on a bail support arm pivotably mounted on a rotor. The guide roller has a flattened shape such that a ratio of an axial length of the roller relative to a diameter thereof falls within 0.10–0.40. Further, the guide roller is formed with a narrow fishline guide groove so that a ratio of an axial length of the fishline guide groove relative to an axial length of the roller falls within 0.05–0.35. It is possible to make a fishline guide roller small in weight and size and to restrict axial motion of a fishline along the guide roller which, among other advantages, reduces line twist in the fishline.

22 Claims, 18 Drawing Sheets

U.S. PATENT DOCUMENTS

| | | |
|---|---|---|
| 2,588,524 | 3/1952 | Herbert . |
| 2,728,534 | 12/1955 | Wallace . |
| 2,774,545 | 12/1956 | Chambers ................................ 242/230 |
| 2,797,055 | 6/1957 | McDonald . |
| 3,342,442 | 9/1967 | Brantingson . |
| 4,398,027 | 8/1983 | Sazaki et al. ........................... 242/233 |
| 4,562,976 | 1/1986 | Ban . |
| 4,705,228 | 11/1987 | Maruyama et al. . |
| 4,969,613 | 11/1990 | Kaneko .................................. 242/231 |
| 5,193,762 | 3/1993 | Takeuchi . |
| 5,261,627 | 11/1993 | Shinohara . |
| 5,547,139 | 8/1996 | Kaneko . |
| 5,560,561 | 10/1996 | Henriksson . |

5,984,219

FISHLINE GUIDE ARRANGEMENT FOR SPINNING REEL

This is a continuation of Application No. 08/550,934, filed Oct. 31, 1995 now U.S. Pat. No. 5,855,327.

BACKGROUND OF THE INVENTION

The present invention relates to a fishline guide arrangement for a spinning reel, which is designed to prevent the entanglement of a fishline during fishing. The present invention also relates to an improved line roller for the arrangement.

A conventional spinning reel for fishing, as shown in FIG. 38, includes a semi-annular bail 411 mounted on the leading ends of a pair of bail support arms 403 through pivotable bail arms 405, so that the bail 411 can be reversibly positioned on a fishline winding side for winding a fishline onto a spool 417 and a fishline playing-out side for freely playing-out the fishline off the spool 417. As shown in FIG. 39, a fishline guide roller 409 is rotatably mounted on a shaft portion 407a of a line slider 407, and the line slider 407 thus equipped with the fishline guide roller 409 is fixed to one of the bail arms 405. As a result the guide roller 409 can guide the fishline when the rotor 401 is rotated in a direction indicated by an arrow A with a manual handle 415 after the bail 405 has been positioned to the fishline winding side.

However, when the rotor 401 is rotated in the fishline winding direction A for winding the fishline onto the spool 417, the fishline 419 is likely to move in a direction (indicated by an arrow B) opposite to the winding direction A along the guide roller 409 as shown in FIG. 40. This axial movement of the fishline 419 on the guide roller 409 causes twists in the fishline 419. As seen from FIGS. 39 and 40 the conventional guide roller 409 has a drum shaped surface shown and the friction between the curved surface of the guide roller 409 and the fishline 419 is greater on the larger diameter portion of the guide roller 409 than it is on the smaller diameter portion thereof. Thus, when the fishline 419 axially moves in the direction B as shown in FIG. 40 during winding of the fishline 419, the guide roller 409 having the drum shaped surface produces twists in the fishline 419 in the same direction.

Moreover, during the casting of the conventional spinning reel, the fishline 419 is played-out off the spool 417 in a spiral manner, and such spiral delivery of the fishline 419 causes twists in the fishline 419 in the same direction. Therefore, the repetition of the playing-out and winding of the fishline 419 during fishing accumulates twists in the fishline 419, which may result in the fishline 419 becoming tangled or broken. Finally, the conventional guide arrangement is undesirably bulky and heavy and can thereby contribute to rotor imbalance.

SUMMARY OF THE INVENTION

An object of the present invention is to overcome the aforementioned disadvantages found in conventional fishline guide arrangements for a spinning reel. Accordingly, one object of the present invention is to provide a fishline guide arrangement that, while sturdy, is smaller and lighter than conventionally available. Another object of the present invention is to provide a fishline guide arrangement for a spinning reel which eliminates the accumulation of twists in a fishline by restricting an axial movement of the fishline on a fishline guide roller. Another object of the present invention is to provide a fishline guide arrangement for a spinning reel which can guide a fishline while positively producing twists in an opposite direction to twists produced in the fishline being played-out off the spool. Yet another object of the present invention is to provide a fishline guide arrangement in which the fishline is prevented from becoming tangled in a fishline guide roller guiding the fishline onto a spool during winding of the fishline.

In order to attain the above-noted and other objects, the present invention provides a fishline guide arrangement for guiding a fishline, which comprises: a bail support member; and a fishline guide roller supported by the bail support member and having an axis and a first axial length (L) defined between opposite axial terminuses of the fishline guide roller. The fishline guide roller has an annular groove for receiving and guiding a fishline.

The annular groove has a second axial length (l). A ratio (l/L) of the second axial length relative to the first axial length is set within a range of 0.5–0.35% so that the annular groove restricts or prevents the fishline from moving axially along the guide roller.

Preferably, the annular groove is formed with a conical bottom surface to positively produce twists in the fishline in the desired direction.

A conical surface may be provided in the vicinity of the annular groove so as to guide the fishline to fall within the annular groove.

A conical surface may be provided within the annular groove itself so as to guide the fishline to the bottom surface of the annular groove. In this case, an angle between the conical surface and the bottom surface should be set so as to prohibit the fishline from ascending up along the conical surface during winding of the fishline.

The annular groove may be designed to have an asymmetrical shape in section. The asymmetrical shape may be selected in accordance with a variety of factors influencing the axial movement of the fishline on the roller on the kind of fishline, including its thickness, the axial position where the annular groove is provided in the guide roller,etc. This asymmetrical design for the annular groove is useful regardless of whether or not the annular groove is rendered sufficiently narrow to fall within the above-mentioned range.

The present invention further provides a fishline guide arrangement for guiding a fishline, which comprises: a bail support member; a fishline guide roller supported by the bail support member and having an axis, an axial length (L) defined between opposite axial terminuses of the fishline guide roller, and a maximum diameter (D), wherein a ratio (L/D) of the axial length relative to the maximum diameter is set within a range of 0.10–0.40.

The present invention provides a fishline guide arrangement for guiding a fishline, which comprises: a bail support member; a fishline guide roller supported by the bail support member and having an axis, the fishline guide roller having an annular groove for receiving a fishline therein and restricting the fishline from moving axially along the guide roller, the annular groove having an asymmetrical shape as viewed in a plane containing the axis.

The present invention provides a fishline guide arrangement for guiding a fishline, which comprises: a bail support member; a line slider connected to the bail support member; a fishline guide roller supported between the bail support member and the line slider and having an axis; and a regulation member extending between the bail support member and the line slider, the regulation member having means for restricting a motion of the fishline along the fishline guide roller in a direction of the axis.

DETAILED DESCRIPTION OF THE PREFERRED EMBODIMENTS

Now, description will be given below in detail of the embodiments of a spinning reel for fishing with reference to the accompanying drawings.

Figure 1:
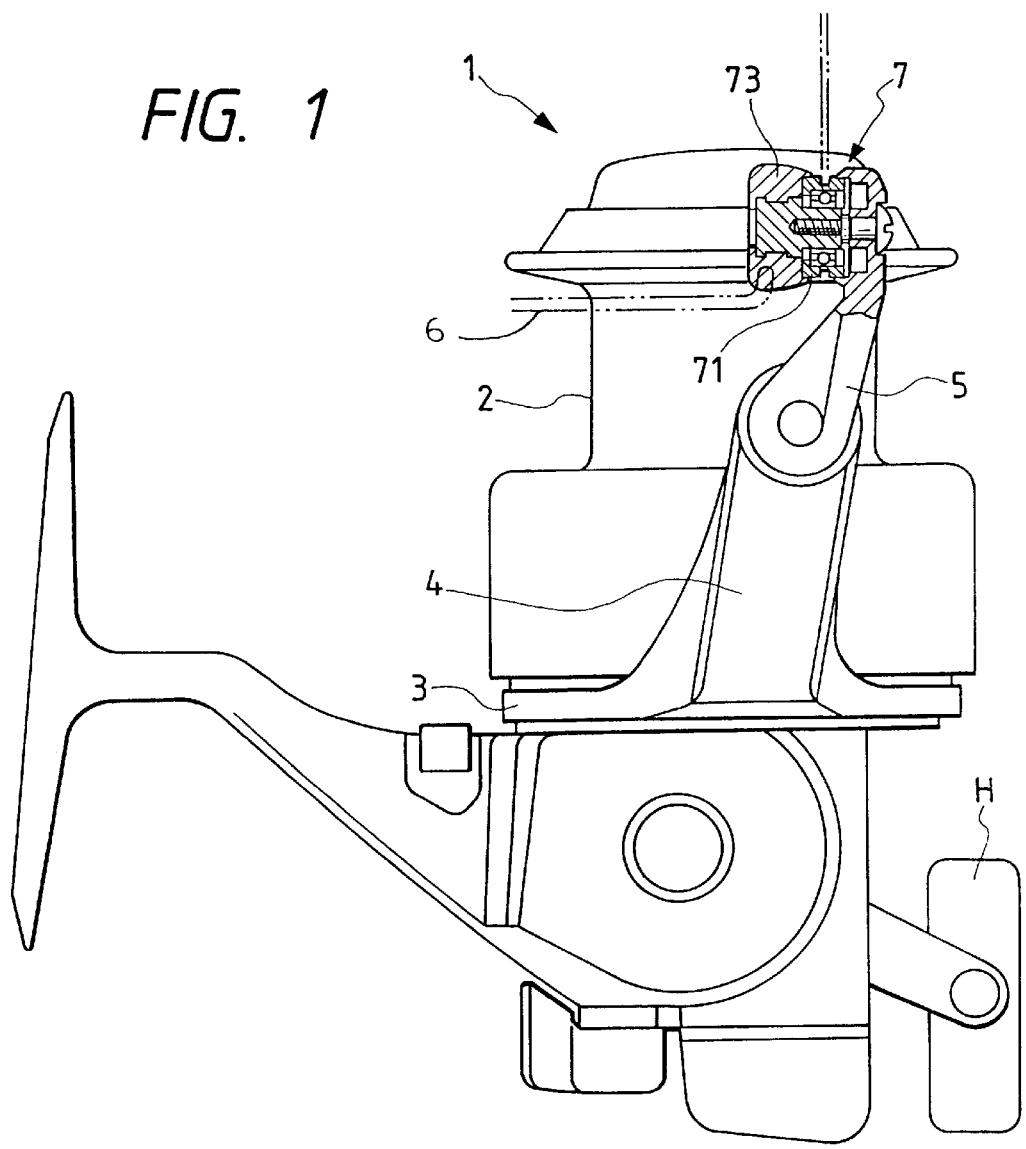
FIG. 1 is a partially sectional, side view showing a spinning reel for fishing provided with a fishline guide arrangement according to a first embodiment of the present invention.

FIG. 1 shows the whole of a spinning reel for fishing equipped with a line roller according to a first embodiment of the invention.

As shown in FIG. 1, the spinning reel for fishing includes a spool 2 disposed in the front portion of a reel main body 1 in such a manner that it can be moved back and forth, a rotor 3 rotatable along the outer periphery of the spool 2 with a distance between them, a pair of bail support arms 4 (in FIG. 1, only one bail support arm 4 is shown, while the other bail support arm is disposed at a symmetrical position), two bail support members 5 respectively mounted on the leading ends of the two bail support arms 4 (in FIG. 1, there is shown one bail support member 5 swingably supported on one bail support arm 4, while the other bail support member is similarly supported swingably on the other bail support arm), a bail 6 provided across the two bail support elements 5, a fishline guide portion 7 provided on one bail support member 5, and a handle H which can be operated to rotate the rotor 3 and to move the spool 2 back and forth. Here, a mechanism for moving the spool 2 back and forth and a mechanism for rotating the rotor 3 are not limited to special mechanisms, but are structured in various ways similarly to the conventional spinning reel for fishing.

Figure 2:
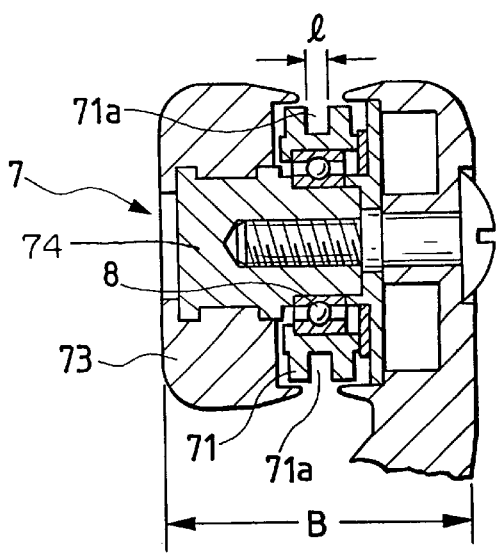
FIG. 2 is a sectional view showing main portions of the first embodiment.

The fishline guide portion 7, as shown in FIGS. 1 and 2, includes a line roller 71 rotatably supported on the bail support member 5 through a bearing 8, and a line slider 73 for guiding the fishline to a fishline guide groove 71a formed in the line roller 71 when the take-up operation of the fishline is started.

Figure 3:
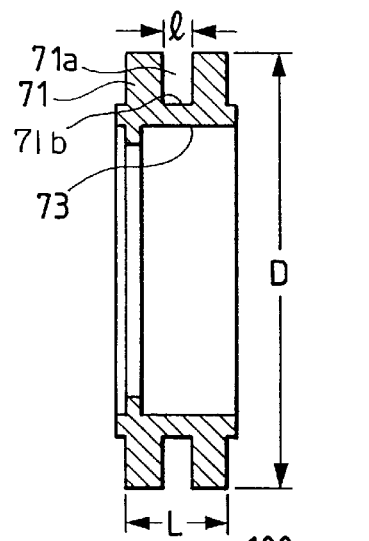
FIG. 3 is a sectional view of a fishline guide roller provided in the first embodiment.

The line roller 71 used in the spinning reel according to the first embodiment of the invention, as shown in FIGS. 1–3, is formed into a relatively flattened disc having an outer width dimension (an axial length) smaller in comparison to the diameter thereof, and includes a bearing support portion 74 in the central portion thereof. The line roller 71 is formed of hard material such as various kinds of ceramics, metal material or the like. For reference, line rollers in the respective embodiments to be described later are similarly formed of such hard material.

As described above, the line roller 71 has such a flattened shape that the outer width dimension thereof is small relative to the diameter thereof, and preferably the outer width dimension L of the line roller 71 is set so as to be approx. 10–40% of the diameter D thereof (see FIG.3).

Here, in the present embodiment, bearing 8 are mounted in the line roller 71, e.g., a ball bearing or the like, for smooth rotation of the line roller. If the diametrical dimension of the line roller 71 is decreased, then the bearing cannot be mounted into the line roller 71, thereby worsening the winding efficiency of the line roller 71. Also, if the outer width dimension L is set large, then the line roller 71 becomes large in size and the rotation balance of the rotor 3 in the take-up operation is worsened due to the increased imbalance amount thereof, thereby worsening the operationability of the line roller 71. Therefore, in the present embodiment, the diameter of the line roller 71 is set to such a dimension that allows the bearing 8 to be mounted in the line roller 71, and allows the outer width dimension L of the line roller 71 to be set small so that the line roller 71 is reduced in size and weight. As a result of this, the fishline guide portion 7 can be reduced in size and weight as a whole due to the reduced size and weight of the line roller 71. This can improve the rotation balance of the rotor and thus the operationability of the spinning reel for fishing in the play-out and take-up operations of the fishline.

Also, in the present invention, the groove width dimension l of the annular fishline guide groove 71*a*, which is formed continuously on the circumferemtial outer periphery of the line roller 71, is set to approx. 5–35% of the outer width dimension L thereof. By setting the groove width dimension l small in this manner, the fishline passing on the fishline guide surface 71*b* of the line roller 71 is restricted or prevented from moving in the groove width direction, which can stabilize the moving path of the fishline to thereby reduce the production of a line twist in the fishline when the fishline is taken up. This can stabilize the winding condition of the fishline around the spool to thereby reduce the occurrence of troubles such as fishline cutting and the like. Also, the stabilized line moving path can control the production of the fishline twining around the bail support member 5 and the like. In the above description, the ratio of the groove width dimension l with respect to the outer width dimension L is set to approx. 0.5–0.35. However, this is a preferred ratio and the invention is not limited to this. Of course, the ratio of the groove width dimension l also includes values which are approximate to the above preferred rate.

In the above description, the groove width dimension l of the fishline guide groove 71*a* is set as a ratio with respect to the outer width dimension L of the line roller 71. This is because the outer width dimension of the line roller 71 is roughly established to some degree, for ordinary spinning reels for fishing. Also, this way of setting is selected in order to set small the groove width dimension l of the fishline guide groove 71*a*. Therefore, when the outer width dimension L of the line roller 71 is set large, the groove width dimension l of the fishline guide groove 71*a* must be determined in accordance with the diameter of the fishline used regardless of the outer width dimension L. That is, according to the invention, the groove width dimension l of the fishline guide groove 71*a* may be set for such a dimension that prevents the fishline from moving greatly in the groove width direction of the fishline guide groove.

Figure 2A:
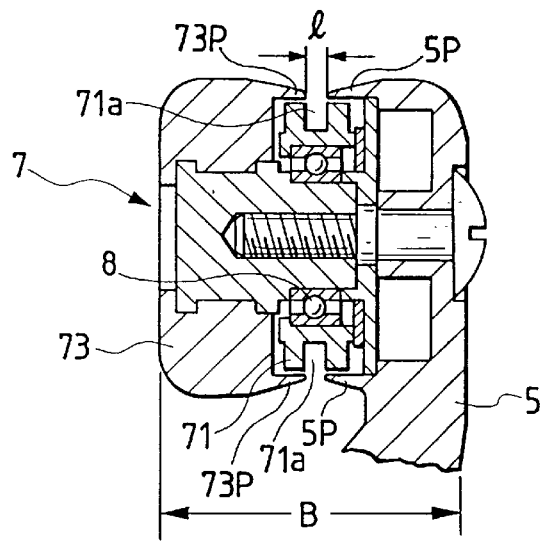
FIG. 2A is a sectional view showing a modification of the first embodiment.

In addition, the first embodiment may be modified such that an annular projection 5P of the bail support member 5 and an annular projection 73P of the line slider 73 extend axially up to the fishline guide groove 71*a* formed in the line roller 71 as shown in FIG. 2A. In this modification, inclined outer peripheral surfaces of the annular projections 5P and 73P are located in the vicinity of the fishline guide groove 71*a* and serve as fishline guide surfaces which guide the fishline to fall within the fishline guide groove 71*a*.

Figure 4:
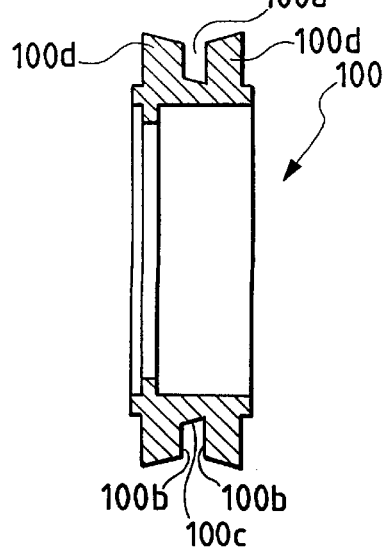
FIG. 4 is a sectional view of a fishline guide roller provided for another modification of the first embodiment.

FIG. 4 is a side section view of a line roller 100 employed in a modification of the above-mentioned first embodiment. In this modification, the wall surface 100*b* of the line roller 100 for defining a fishline guide groove 100*a* is set at right angles to the axis of the line roller 100. A fishline guide surface 100*c* forming the bottom surface of the fishline guide groove 100*a* is formed in a tapered shape such that it gradually increases in diameter toward the take-up rotation direction of the rotor. The taper angle of the fishline guide surface 100*c* can be set in the range of 1°–10°. However, the taper angle is best set at a stage of design in which the size of the reel used can be taken into consideration and is not limited to the above range. Also, in the present modification, the outer peripheral surface of the line roller 100 is formed by inclined surfaces 100*d* that respectively slant downward from the two sides of the line roller 100 toward the fishline guide groove 100*a*, such that the inclined surfaces 100*d* guide the fishline to the fishline guide groove 100*a*.

Figure 5:
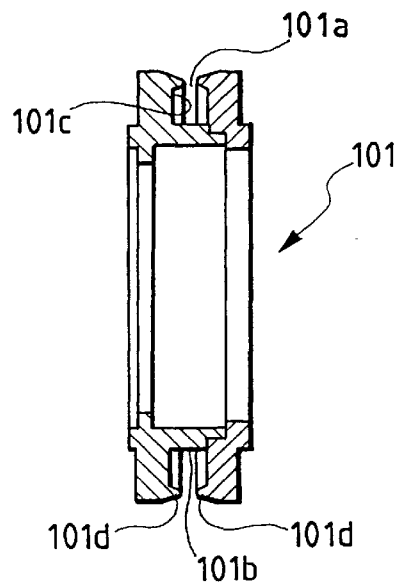
FIG. 5 is a sectional view of a fishline guide roller provided for a second embodiment of the present invention.

FIG. 5 is a side section view of a line roller 101 employed in a second embodiment of a spinning reel for fishing according to the invention. In the line roller 101, the fishline guide surface 101 101*b* of a fishline guide groove 101*a* is formed parallel to the axis of the line roller 101. The fishline guide groove 101*a* is defined by two mutually opposing wall surfaces 100*c* and also, in the respective peripheral edge portions of the two wall surfaces 101*c*, there are formed annular guide portions 101*d* which project into the fishline guide groove 101*a*. When the fishline is taken up, the mutually opposing peripheral edge portions of the guide portions 101*d* contact with the fishline to thereby regulate the motion of the fishline so as to be able to always hold the fishline substantially at the central position (including the central position) of the fishline guide surface 101*b*. In the illustrated embodiment, as shown by hatching extending in different directions, parts which respectively form the right and left side wall portions of the line roller are formed separately from each other, and the two separate parts are threadedly fitted with each other and are thereby connected into a united body. The reason why the two parts are molded separately and are then connected together is to facilitate the molding of the parts, because the guide portions 101*d* are formed so. as to project toward the fishline guide groove 101*a*. Of course, the two parts can also be connected together by pressure insertion, welding, adhesives or the like.

Figure 6:
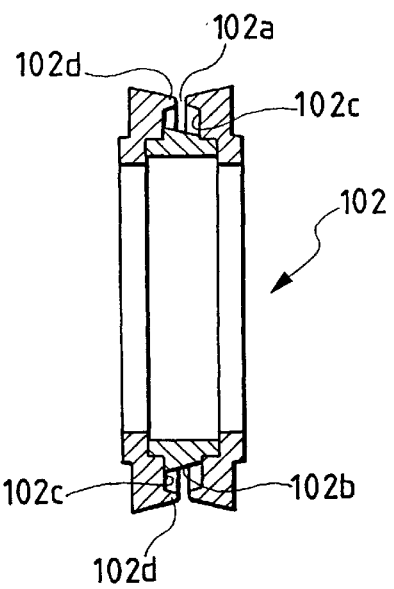
FIG. 6 is a sectional view of a fishline guide roller provided for a modification of the second embodiment.

FIG. 6 is a side section view of a line roller 102 employed in a modification of the second embodiment. In the present modification as well, the fishline guide groove 102*a* is defined by two mutually opposing wall surfaces 102*c* Also in the respective peripheral edge portions of the two wall surfaces 102*c*, there are formed annular guide portions 102*d* which project into the fishline guide groove 102*a*. In the present modification, however the fishline guide surface 102*b* is formed in in a tapered shape, that it gradually increases in diameter toward the take-up rotation direction of the rotor. Further, in the modification of the second embodiment, three parts or members, which are respectively used to form the right and left wall surfaces and the fishline guide surface 102b of the line roller, are molded separately from one another. As shown in FIG. 6, the three parts are then threadedly fitted with one another to form a united body. Here, of course, the three parts can also be connected by pressure insertion, welding, adhesives or the like.

Figure 7:
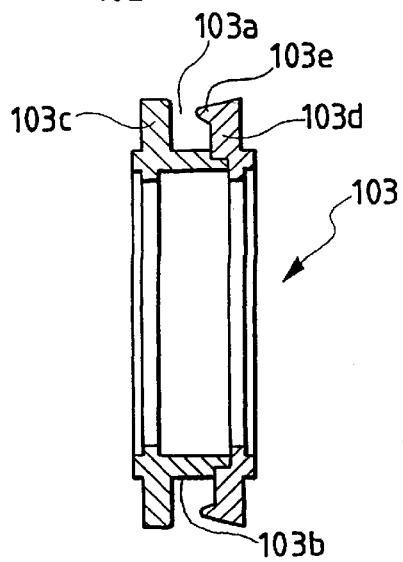
FIG. 7 is a sectional view of a fishline guide roller provided for a third embodiment of the present invention.

FIG. 7 is a side section view of a line roller 103 employed in a third embodiment of a spinning reel for fishing according to the invention. In the third embodiment, the line roller 103 includes a fishline guide groove 103a which is defined by two side wall portions 103c and 103d. The wall surface of one side wall portion 103c is formed straight from a fishline guide surface 103b to the peripheral end thereof, whereas the other side wall portion 103d includes a guide portion 103e which is formed so as to project into the fishline guide groove 103a. Also, in the third embodiment, the fishline guide surface 103b is formed parallel to the axis of the line roller 103. Further, in the present embodiment as well, as shown by different hatching in FIG. 7, the fishline guide surface 103b and one side wall portion 103c are formed of a common member, while the common member is connected integrally with the other side wall portion 103d by adhesion or by pressure insertion.

Figure 8:
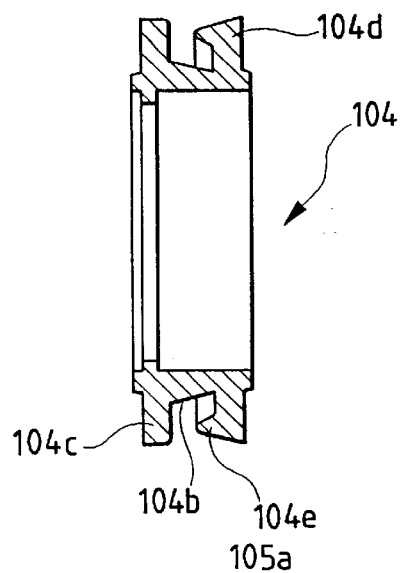
FIG. 8 is a sectional view of a fishline guide roller provided for a modification of the third embodiment.

Next, FIG. 8 gives a side section view of a line roller 104 employed in a modification of the third embodiment of a spinning reel for fishing according to the invention. In the present modification, a fishline guide surface 104b is formed in such a tapered shape that it is gradually increased in diameter toward the take-up rotation direction of the rotor. In the present modification, in FIG. 8, the whole line roller is shown in such a manner that it is formed as a united body. However, of course, similarly to the third embodiment, two or more divisional parts may be molded separately from one another and, after that connected together into a united body.

Figure 9:
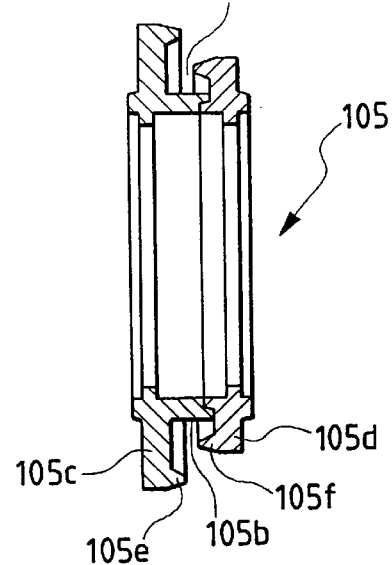
FIG. 9 is a sectional view of a fishline guide roller provided for a fourth embodiment of the invention.

FIG. 9 is a side section view of a line roller 105 employed in a fourth embodiment of a spinning reel for fishing according to the invention. In the fourth embodiment, the line roller 105 includes a fishline guide groove 105a which is defined by two side wall portions 105c and 105d. The side wall portion 105c is located on the side of the fishline take-up rotation direction of the rotor and is larger in diameter than the other side wall portion 105d which is located opposed to the side wall portion 105c. On the respective outer peripheries of the two side wall portions 105c and 105d, there are formed guide portions 105e and 105f which respectively project into the fishline guide groove 105a. In the present embodiment as well, as shown by different hatching in FIG. 9, a fishline guide surface 105b and one side wall portion 105c are formed of a common member, while the common member and the other side wall portion 105d are connected together into a united body by adhesion or by pressure insertion.

Figure 10:
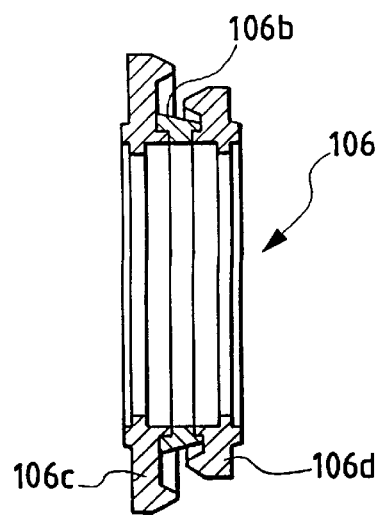
FIG. 10 is a sectional view of a fishline guide roller provided for a modification of the fourth embodiment.

Next, FIG. 10 is a side section view of a line roller 106 employed in a modification of the fourth embodiment. In the present modification of the fourth embodiment, the line roller 106 includes a fishline guide surface 106b which is formed in such a tapered shape that it gradually increases in diameter toward the take-up rotation direction of the rotor. In the present modification as well, as shown by different hatching, the three members that are used to form the right and left side walls 106c, 106d and the fishline guide surface 106b of the line roller 106 are molded separately from one another. As shown in FIG. 10, they are then connected together into a united body by means of threaded fitting. However, in this case as well, of course, the three members can also be connected together by pressure insertion, welding, adhesives or the like. Also, in the present modification as well, similarly to the fourth embodiment shown in FIG. 9, one side wall portion and the portion forming the fishline guide surface 106b may be previously formed as an integral body and, after that, the integral body may be connected together to the other side wall portion.

Figure 11:
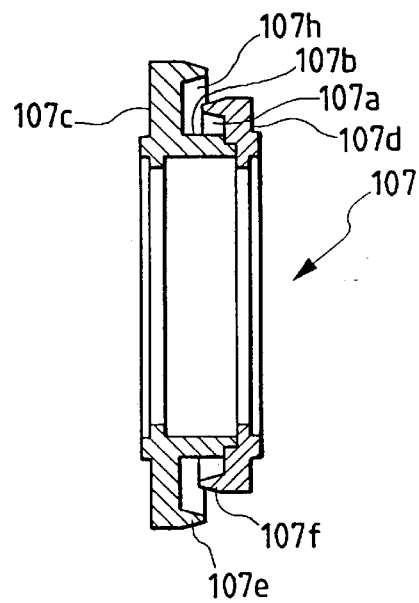
FIG. 11 is a sectional view of a fishline guide roller provided for a fifth embodiment of the invention.

FIG. 11 provides a side section view of a line roller 107 employed in a fifth embodiment of a spinning reel for fishing according to the invention. In the fifth embodiment, the line roller 107 includes a fishline guide groove 107a which is defined by two side wall portions 107c and 107d. Similarly to the fourth embodiment, one side wall portion 107c, which is located on the take-up rotation side of the rotor, is formed larger in diameter than the other side wall portion 107d which is disposed opposed to the side wall portion 107c. On the respective outer peripheries of the two side wall portions 107c and 107d, there are provided guide portions 107e and 107f which respectively project into the fishline guide groove 107a. In the present embodiment, however, the guide portion 107f of the smaller diameter side wall portion 107d is formed such that it enters into a recessed portion 107h formed in the larger diameter side wall portion 107c. Also, the fishline can be guided to the fishline guide surface 107b of the fishline guide groove 107a by the two guide portions 107e and 107f in such manner that the fishline is held by and between them. This prevents the fishline from moving on the fishline guide surface 107b in the groove width direction, thereby being able to control the moving path of the fishline in a stable manner. The fishline guide surface 107b in the present embodiment is formed parallel to the axis of the line roller 107. Also, in the present embodiment, as shown by different hatching in FIG. 11, the portion forming the fishline guide surface 107b and one side wall portion 107c are formed of a common member, while the common member is then connected to the small diameter side wall portion 107d as a united body by means of threaded fitting or the like.

Figure 12:
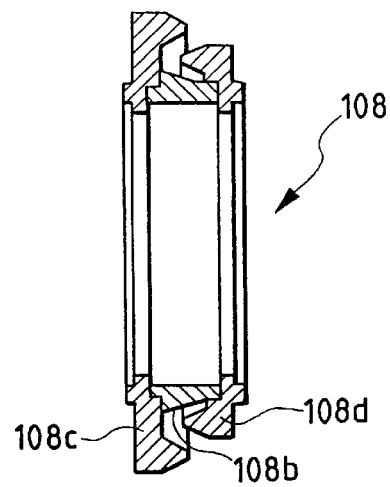
FIG. 12 is a sectional view of a fishline guide roller provided for a modification of the fifth embodiment.

FIG. 12 shows a side section view of a line roller 108 employed in a modification of the fifth embodiment. In the present line roller 108, a fishline guide surface 108b of the line roller 108 is formed in a tapered shape so that it gradually increases in diameter toward the take-up rotation direction of the rotor. In the present modification as well, as shown by different hatching, three members which are used to form the right and left side wall portions 108c, 108d and the fishline guide surface 108b of the line roller 108 are produced separately from one another and, then, as shown in FIG. 10, the large diameter side wall portion 108c and the member forming the fishline guide surface 108b are connected together into a united body by means of a threaded fitting, while the other small diameter side wall portion 108d and the member forming fishline guide surface 108b are connected together into a united body by pressure insertion, welding or adhesion.

Figure 13:
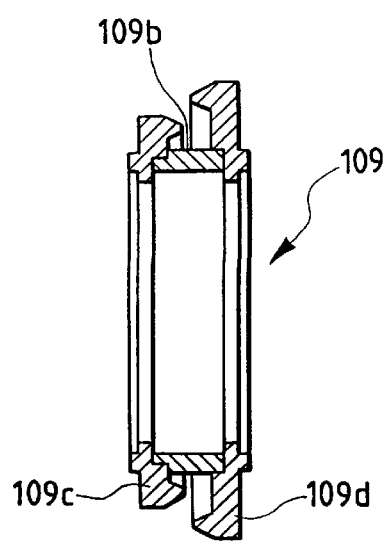
FIG. 13 is a sectional view of a fishline guide roller provided for a sixth embodiment of the invention.

FIG. 13 shows a side section view of a line roller 109 employed in a sixth embodiment of a spinning reel for fishing according to the invention. In the sixth embodiment, contrary to the fourth embodiment shown in FIG. 9, one side wall portion 109c of the line roller 109, which is situated on the rotor take-up rotation direction side, is set small in diameter, whereas the other side wall portion 109d situated on the opposite side is set large in diameter. In the sixth embodiment, the fishline guide surface 109b of the line roller 109 is set parallel to the axis of the line roller 109.

Figure 14:
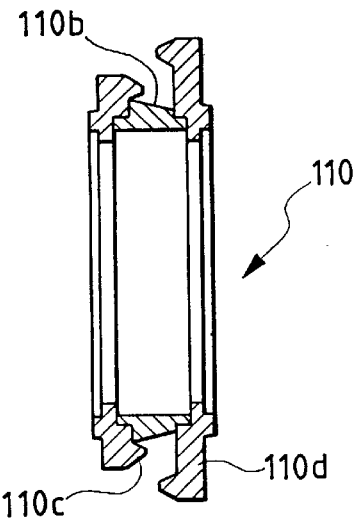
FIG. 14 is a sectional view of a fishline guide roller provided for a modification of the sixth embodiment.

Next, FIG. 14 shows a side view of a line roller 110 employed in a modification of the sixth embodiment. In the present modification, the fishline guide surface 110b of the line roller 110 is formed in such a tapered shape that it gradually increases in diameter toward the take-up rotation direction side of the rotor. And, in the present modification as well, as shown by different hatching, three members which are respectively used to form the right and left side wall portions 110c, 110d and the fishline guide surface 10b of the line roller 110 are produced separately from one another and, as shown in FIG. 10, one side wall portion 110c is connected to the large diameter side of the member forming the fishline guide surface 110b by pressure insertion, welding or adhesion, while the other side wall portion 110d is connected to the small diameter side of the member forming the fishline guide surface 110b by pressure insertion, welding or adhesion.

Figure 15:
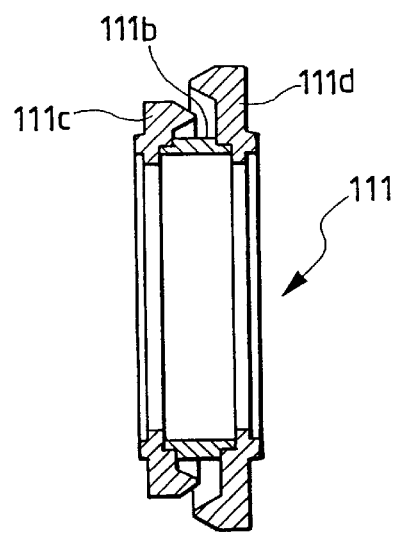
FIG. 15 is a sectional view of a fishline guide roller provided for a seventh embodiment of the invention.

FIG. 15 shows a side section view of a line roller 111 employed in a seventh embodiment of a spinning reel for fishing according to the invention. The seventh embodiment is similar to the fifth embodiment of FIG. 11 except that, contrary to the fifth embodiment shown in FIG. 11, the side wall portion 111c of the line roller 111 situated on the rotor take-up rotation direction side is set small in diameter, whereas the other side wall portion 111d of the line roller 111 on the opposite side is set large in diameter. In the seventh embodiment, the fishline guide surface 111b of the line roller 111 is formed parallel to the axis of the line roller 111.

Figure 16:
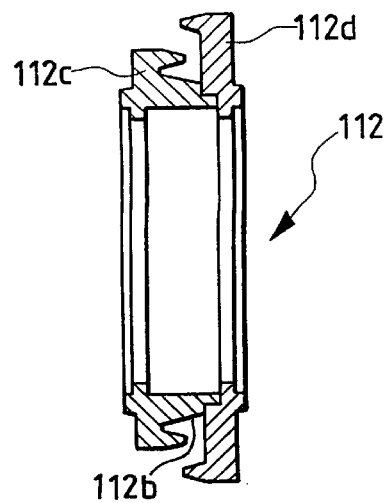
FIG. 16 is a sectional view of a fishline guide roller provided for a modification of the seventh embodiment.

FIG. 16 shows a side view of a line roller 112 employed in a modification of the seventh embodiment. In the present modification, the fishline guide surface 112b of the line roller 112 is tapered in shape that, to gradually increases in diameter toward the take-up rotation direction side of the rotor. In the present modification as shown by different hatching, the small diameter side wall portion 112c of the line roller 112 and the fishline guide surface 112b thereof are formed integral with each other, whereas the larger diameter side wall portion 112d, which is molded separately from them, is connected integrally to the above-mentioned integral body by pressure insertion, welding or adhesion.

Figure 17:
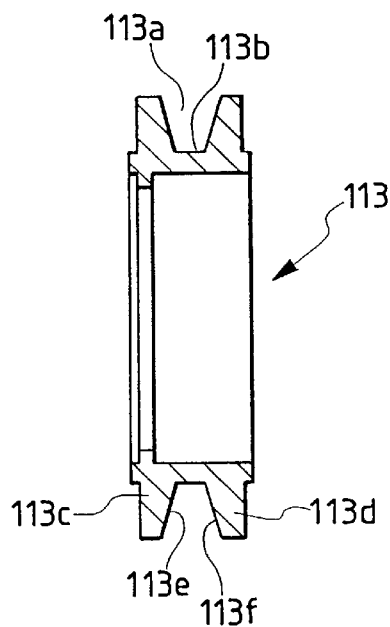
FIG. 17 is a sectional view of a fishline guide roller provided for an eighth embodiment of the invention.

FIG. 17 shows a side section view of a line roller 113 employed in an eighth embodiment of a spinning reel for fishing according to the invention. In the eighth embodiment, the fishline guide groove 113a of the line roller 113 is formed such that it decreases in width from the outer periphery thereof toward the fishline guide surface 113b of the line roller 113. In the present embodiment, the fishline guide groove 113a is defined by two side wall portions 113c and 113d which respectively include mutually opposing wall surfaces 113e and 113f, while the two wall surfaces 113e and 113f are formed inclined such that the opposing distance between them gradually decreased from their respective outer periphery sides toward the fishline guide surface 113b. And, in the present embodiment, the fishline guide surface 113b is formed parallel to the axis of the line roller 113.

Figure 18:
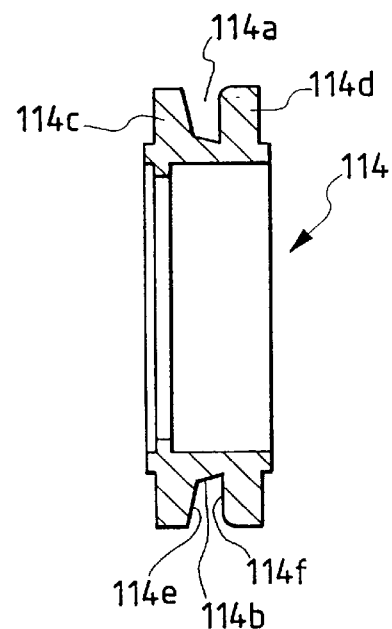
FIG. 18 is a sectional view of a fishline guide roller provided for a modification of an eighth embodiment.

FIG. 18 shows a side section view of a line roller 114 employed in a ninth embodiment of a spinning reel for fishing according to the invention. In the present embodiment, similarly to the embodiment shown in FIG. 17, the fishline guide groove 114a of the line roller 114 is formed such that the width thereof gradually decreases toward the fishline guide surface 114b of the line roller 114. However, in the present embodiment, the side wall surface 114f of one side wall portion 114d is formed perpendicular to the axis of the line roller 114, while the side wall surface 114e of the other wall portion 114c opposed to the side wall surface 114f is formed inclined such that it gradually approaches the side wall surface 114f.

Figure 19:
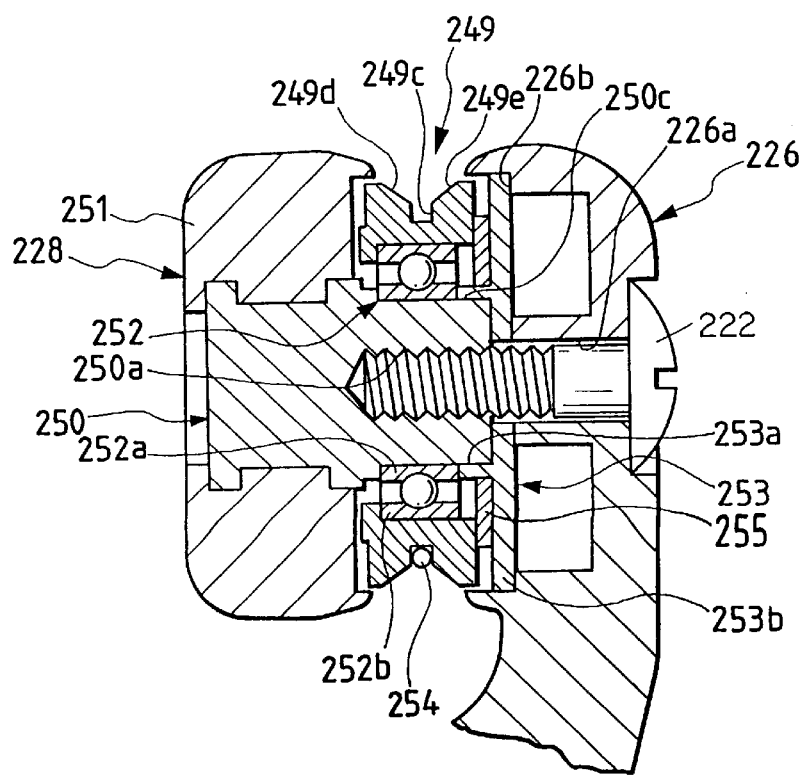
FIG. 19 is a sectional view of main portions of a ninth embodiment of the invention.
Figure 20:
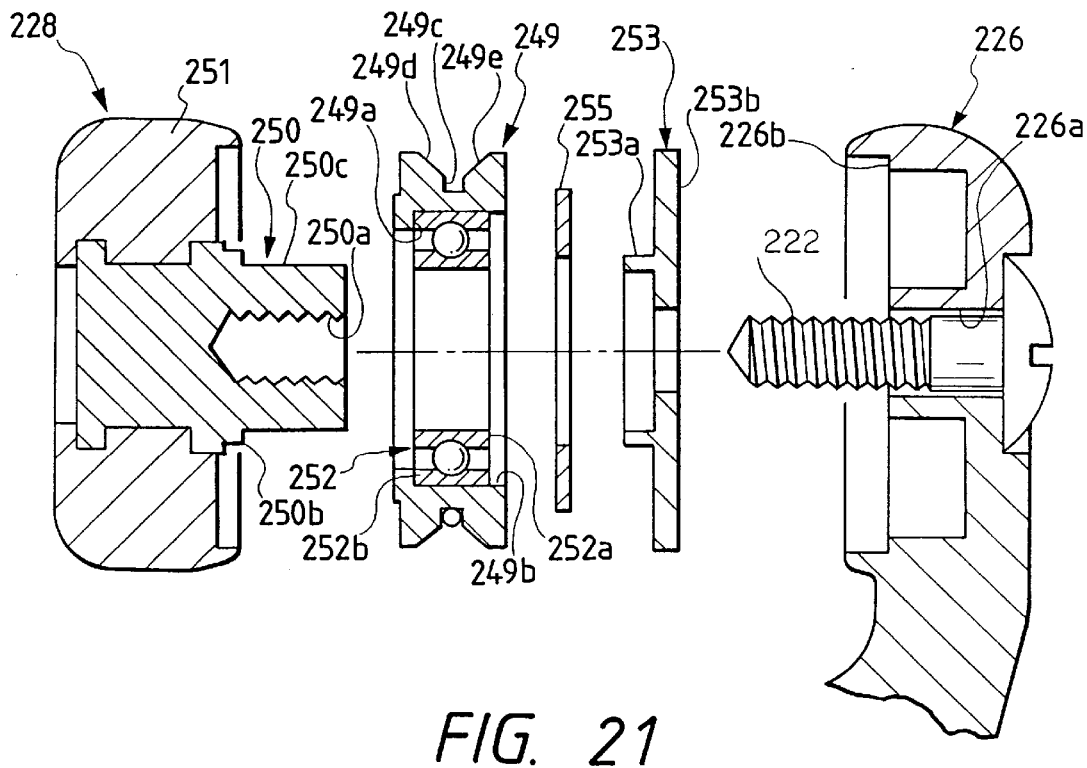
FIG. 20 is an exploded, sectional view of the main portions of the ninth embodiment.

In FIGS. 19 and 20, there is shown a ninth embodiment of a fishline guide roller which is mounted on a bail support member.

A fishline guide roller 249 is mounted to one bail support member 226 with the use of a mounting portion (a line slider) 228.

The mounting portion 228 comprises a shaft portion 250 and an outer mounting portion 251 formed on the outside of one end of the shaft portion 250.

A through hole 226a opens up in one bail support member 226, and a screw 222 inserted into the through hole 226a is threadedly engaged into a screw hole 250a formed in the shaft portion 250 of the mounting portion 228, so that the mounting portion 228 can be mounted in place.

The shaft portion 250 includes the screw hole 250a in the central portion thereof and, in the outer periphery of the shaft portion 250, there are provided a securing portion 250b in the form of a step (FIG. 20) and a small diameter portion 250c. The inner race member 252a of a rolling bearing 252 and the cylindrical securing portion 253a of a securing member 253 are respectively fitted on the outer periphery of the small diameter portion 250c.

A securing portion 249a in the form of a step and a large diameter portion 249b are formed on the inner periphery of the fishline guide roller 249 which guides a fishline 254 to a spool 217 so that the large diameter portion 249b is fitted on the outer periphery of the outer race member 252b while the securing portion 249a is in abutment with the rolling bearing 252.

A securing member 253 includes the cylindrical securing portion 253a, to be fitted with and fixed to the outer periphery of the small diameter portion 250c of the mounting portion 228, and a flange portion 253b, which is brought into abutment with the bottom surface of a recessed portion 226b formed in the bail support member 226.

The outer periphery of the fishline guide roller 249 includes a fishline guide portion 249c in the form of a small width groove and two fishline guiding inclined surfaces 249d and 249e which are respectively formed on the two sides of the fishline guide roller 249 in such a manner that they are inclined toward the fishline guide portion 249c.

When the mounting portion 228 and fishline guide roller 249 are assembled into the bail support member 226, the outer race member 252b of the rolling bearing 252 is first fitted with the inner periphery large diameter portion 249b of the fishline guide roller 249 and is then contacted with and fixed to the securing portion 249a of the fishline guide roller 249.

Thereafter, the inner race member 252a of the rolling bearing 252 is fitted with the outer periphery of the small diameter portion 250c of the bail mounting portion 228. A washer 255 formed of synthetic resin is then fitted with the outer periphery of a securing portion 253a formed in the securing member 253, so that the inner race member 252a of the rolling bearing 252 is held by the securing portion 250b of the bail mounting portion 228 and the securing portion 253a of the securing member 253. In other words the former is fitted with and fixed to the latter.

The thus assembled bail mounting portion 228 and fishline guide roller 249 are mounted on the bail support member 226 by means of the screw 222.

As in the above-mentioned structure, if the fishline guide roller 249 is mounted on the bail support member 226, then the outer race member 252b of the rolling bearing 252 is contacted with and fixed to the securing portion 249a of the fishline guide roller 249. The inner race member 252a of the rolling bearing 252 is fitted with the outer periphery of the small diameter portion 250c of the bail mounting portion 228, and is held by and secured to lo the securing portion 250b of the bail mounting portion 228 and the securing portion 253a of the securing member 253. This can reliably prevent the fishline guide roller 249 from clattering in the thrust direction as well as make it possible to take up the fishline smoothly and stably.

When the fishline 254 is guided to the spool, the fishline 254 is positively guided to the small-width-groove shaped fishline guide portion 249c by the two fishline guiding inclined surfaces 249d and 249e which are respectively formed on the two sides of the fishline guide roller 249 in an inclined manner. Further, the fishline guide portion 249c in the form of the small-width-groove shape regulates unnecessary motion of the fishline in the axial direction on the outer, circumferential periphery of the fishline guide roller 249 during the fishline take-up operation, to thereby stabilize the moving path of the fishline. Therefore, production of line twist in the fishline can be prevented as much as possible when the fishline is operated, whereby the fishing operation can be performed more smoothly.

Figure 21:
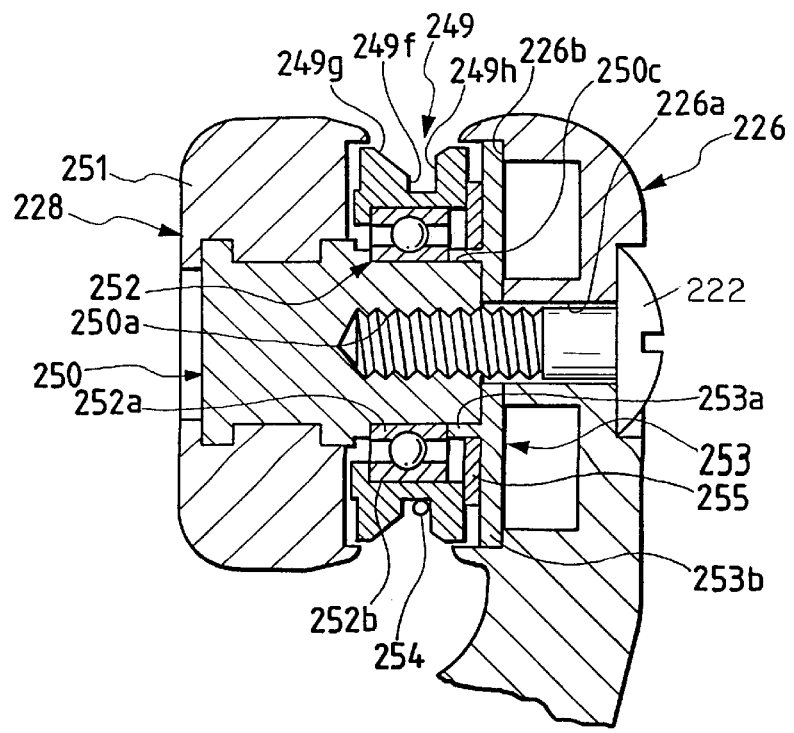
FIG. 21 is a sectional view of main portions of a tenth embodiment.
Figure 22:
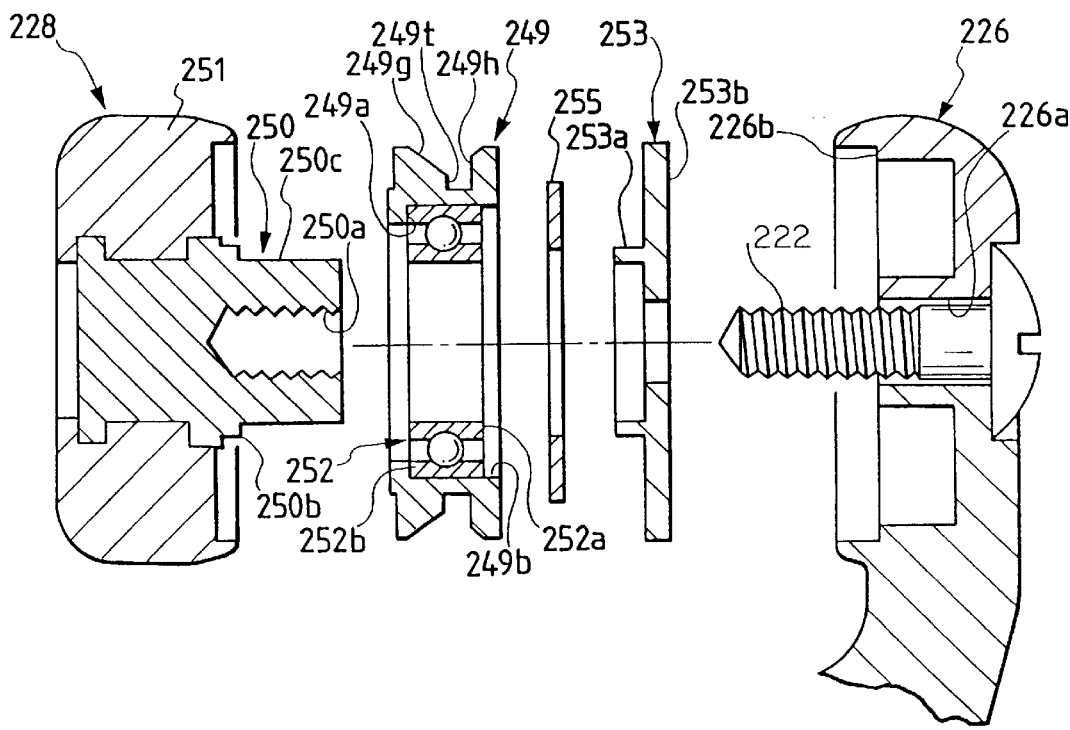
FIG. 22 is an exploded, sectional view of the main portions of the tenth embodiment.

In FIGS. 21 and 22, there is shown a tenth embodiment of a fishline guide roller mounted on a bail support member.

In the tenth embodiment of the fishline guide roller mounted on the bail support member, a fishline guide portion 249f in the form of a small-width groove formed on the outer periphery of the fishline guide roller 249 is formed in such a manner that it is shifted toward the bail support member 226. A fishline guiding inclined surface 249g is formed near to the bail mounting portion 228 and inclined toward the fishline guide portion 249f, whereas a wall-like portion 249h is formed near to the bail support member 226.

The remaining structural portions of the tenth embodiment are similar to those of the previously described ninth embodiment of a fishline guide roller mounted on a bail support member, and thus the tenth embodiment can provide similar operation and effect to the ninth embodiment.

Figure 24:
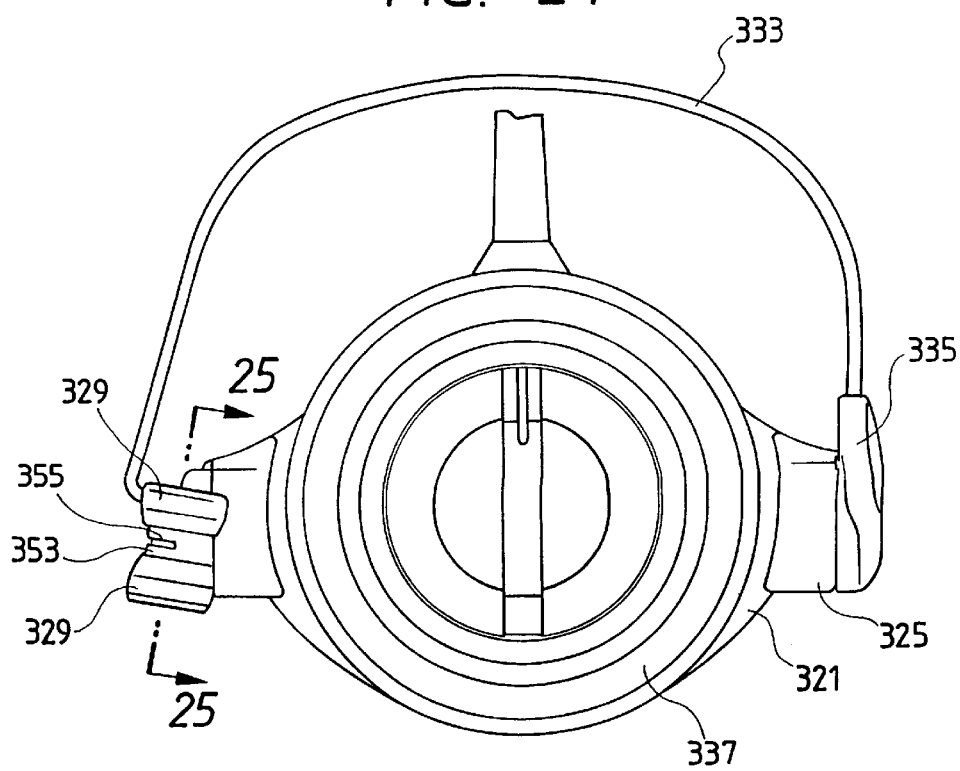
FIG. 24 is a front view of the spinning reel shown in FIG. 23.
Figure 23:
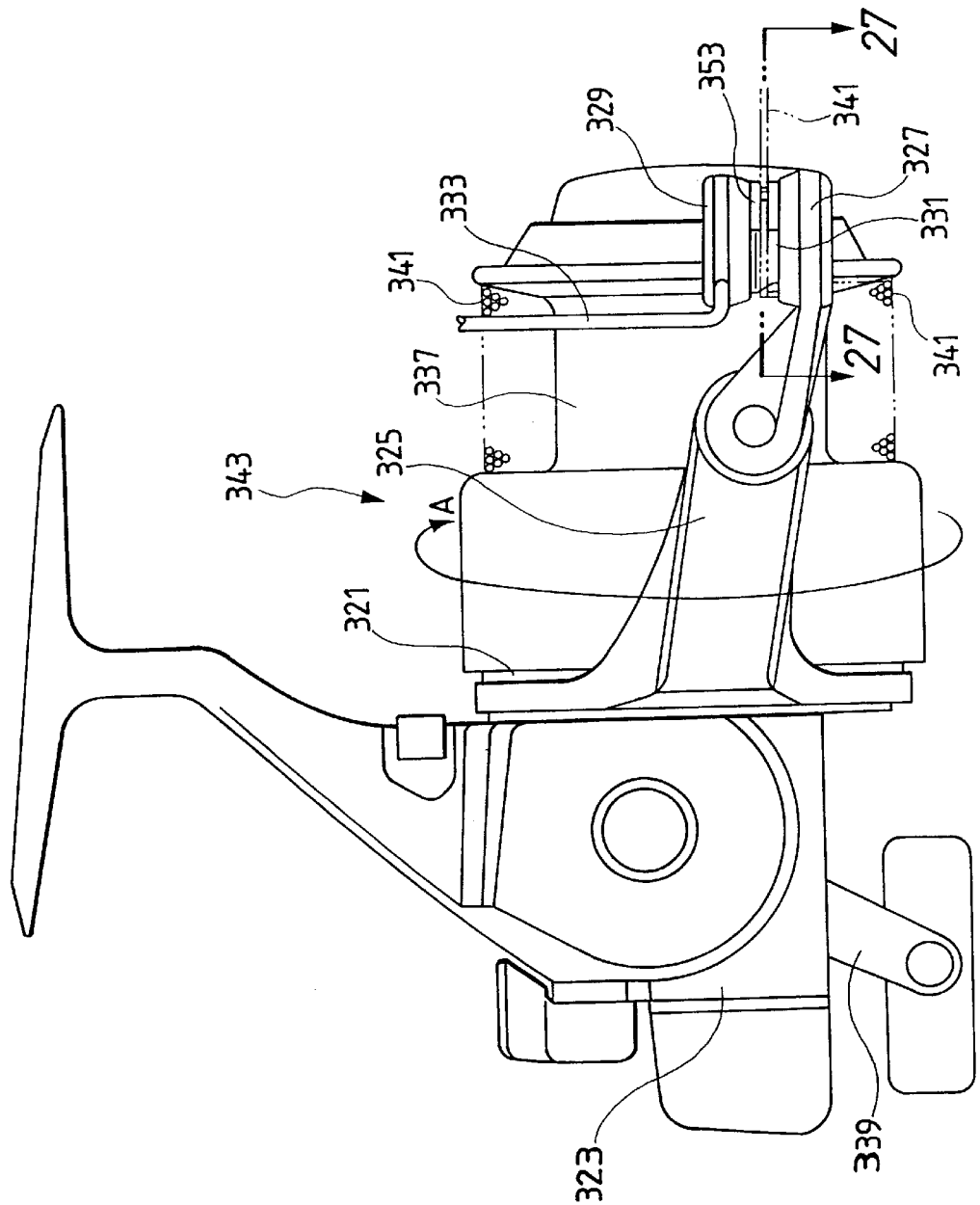
FIG. 23 is a side view of a spinning reel for fishing provided with a fishline guide arrangement according to an eleventh embodiment of the invention.

FIG. 23 shows an eleventh embodiment of a spinning reel for fishing according to the invention. In FIG. 23, reference character 321 designates a rotor which is rotatably mounted on a reel main body 323 and includes a pair of integral rotor support arms 325. One of the rotor support arms 325 supports at the leading end thereof a line roller 331 through support means which is made up of an arm lever 327 and a line slider (a hold member) 329. As shown in FIG. 24, between the two rotor support arms 325, there is mounted a semi-annular bail 333 through the line slider 329 and a bail holder 335 in such a manner that the bail 333 can be freely reversed between the fishline take-up position and the fishline play-out position.

Also, reference character 337 stands for a spool which is mounted coaxially with respect to the rotor 321 and is supported on a spool shaft (not shown) mounted on the reel main body 323 to move in reciprocating fashion. If at the bail 333 is lowered to the fishline take-up position and the rotor 321 is rotated in a fishline take-up direction (in FIG. 23, a direction corresponding to arrow A) by operation a hand-operated handle 339, then a fishline 341 can be wound around the reciprocating spool 337 and in unison with the rotation of the rotor 321.

Figure 25:
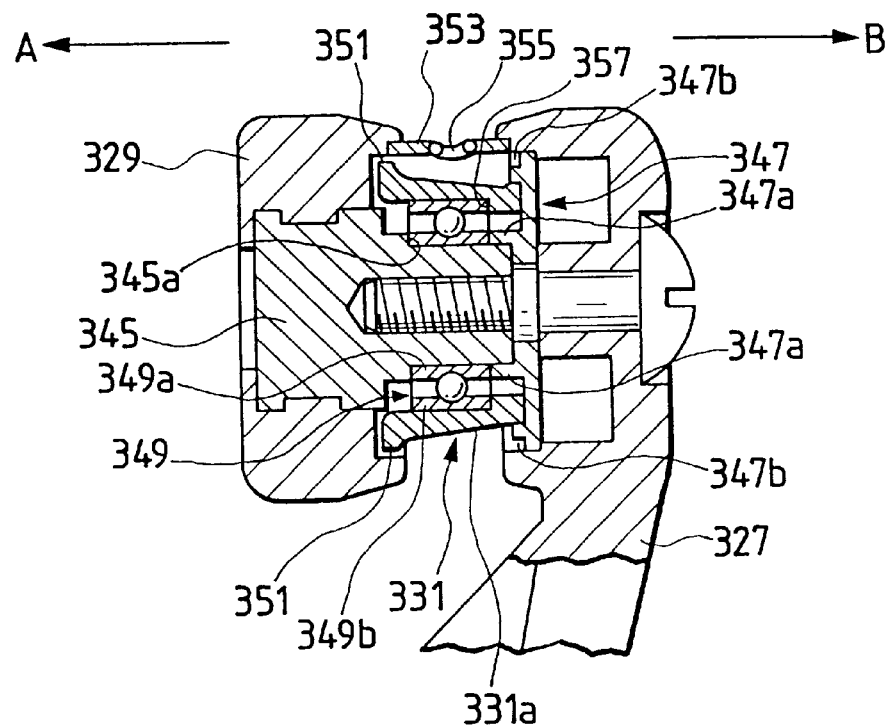
FIG. 25 is a sectional view of main portions of the eleventh embodiment taken along line 25—25 of FIG. 24.

As shown in FIG. 25, the line slider 329 is bolted to the arm lever 327 through a bearing metal 345 which is fitted with the central portion of the slider 329. An inner annular flange portion 347a provided in a hold plate 347 is mounted on the end portion of the arm lever 327 of the bearing metal 345, By bolting the bearing metal 345 to the arm lever 327, the hold plate 347 is held between the bearing metal 345 and the arm lever 327.

A ball bearing 349 is mounted on the outer periphery of the bearing metal 345, with the inner race member 349a thereof in contact with the inner annular flange portion 347a of the hold plate 347, while the line roller 331 is rotatably mounted between the arm lever 327 and the line slider 329 through the ball bearing 349.

Also, the inner race member 349a of the ball bearing 349 is secured to a securing portion 345a provided in the bearing metal 345 near to the line slider 329. The inner annular flange 347a of the hold plate 347 and the securing portion 345a hold the ball bearing 349 between them and also determine the position of the ball bearing 349.

On the other hand, the line roller 331, as shown in FIG. 25, is formed in a tapered shape such that the fishline guide portion 331a thereof steadily increases in diameter toward the fishline take-up direction (a direction of an arrow A) of the rotor 321. And, the line roller 331 includes a flange portion 351 which is formed integral therewith and located near to the line slider 329. The flange portion 351 prevents the fishline 341 from entering between the line slider 329 and line roller 331 when the bail 333 is reversed from the fishline play-out position to the fishline take-up position and the fishline 341 is guided to the line roller 331. Also, the peripheral edge portion of the line roller 331 near to the arm lever 327 is covered with an outer annular flange portion 347b provided in the hold plate 347.

In general, the material used for the line roller can be selected from various kinds of ceramics. Aternatively, the roller can be fashioned as a hard member which can be produced by plating hard material on copper alloy. The line roller 331 employed in the present embodiment is preferably formed of such hard member.

Figure 26:
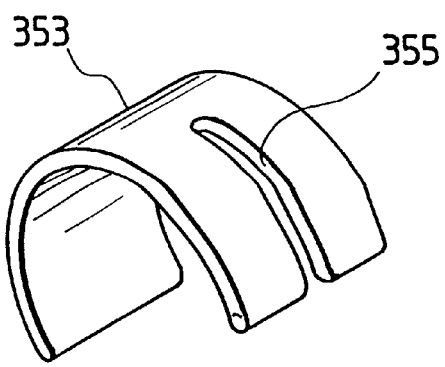
FIG. 26 is a perspective view of a regulation member provided for the eleventh embodiment.
Figure 27:
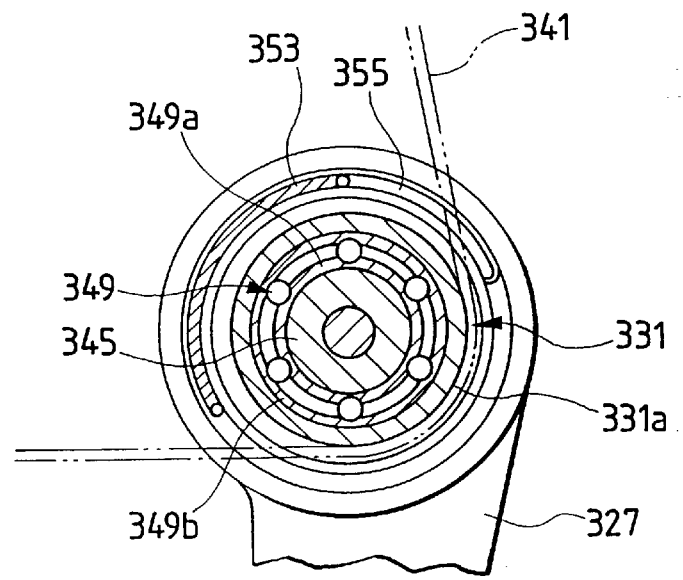
FIG. 27 is a sectional view taken along line 27—27 of FIG. 23.

Further, in FIG. 25, reference character 353 designates a regulation member which is interposed between the arm lever 327 and line slider 329. As shown in FIGS. 26 and 27, the regulation member 353 is constructed from a plate member having a substantially arc-shaped section which is formed and positioned along the outer periphery of the line roller 331. The regulation member 353 includes in the central portion of one circumferential end side thereof a regulation portion 355 in the form of a slit cut out to extend along the outer periphery of the line roller 331.

Figure 28:
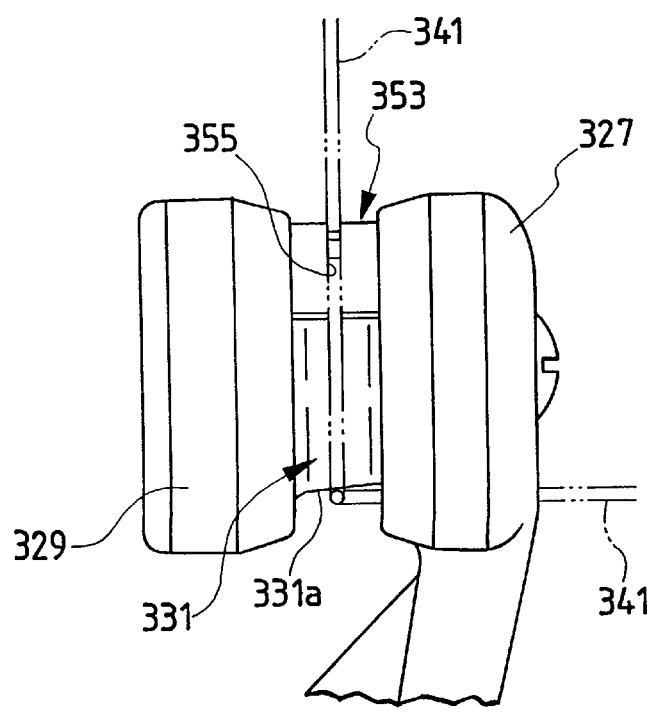
FIG. 28 is a side view of the main portions of the eleventh embodiment.

As shown in FIGS. 23 and 27, the regulation portion 355 is opened to permit the fishline 341 to have access to the line roller 331 through the regulation member 353 when the bail 333 is moved from the fishline play-out position to the fishline take-up position. As shown in FIG. 28, when the fishline 341 is taken up, the regulation portion 355 regulates the motion of the fishline 341 to thereby always position the fishline 341 in the central portion of the line roller 331.

Also, as shown in FIG. 25, a securing portion 357, which is formed in the inner periphery of the line roller 331 near to the arm lever 327, is in contact with the outer race member 349b of the ball bearing 349 to thereby regulate the motion of the line roller 331 in a direction of an arrow A.

Here, it is expected that the taper angle of the line roller 331 can be set in the range of 1°–12°. However, the taper angle is to be set properly at the stage of design according to the size of the reel, the standard use fishline and the like and thus the taper angle is not limited to the above numerical values at all.

Since the present embodiment is structured in this manner, if the bail 333 is reversed from the fishline play-out condition to the fishline take-up condition to thereby guide the fishline 341 to the line roller 331, then, as shown in FIG. 28, the fishline 341 being guided from the rod top side to the line roller 331 is inserted through the regulation portion 355, Also, during this fishline guide operation, the flange portion 351 prevents the fishline 341 from entering between the line slider 329 and line roller 331.

If the rotor 321 is rotated in the arrow A direction by means of the operation of the hand-operated handle 339, then the fishline 341 being guided to the line roller 331 is going to move in a direction of an arrow B which is opposite to the fishline take-up direction of the rotor 321. However the regulation portion 355 regulates the motion of the fishline 341 to thereby always hold the fishline 341 at the central position of the line roller 331.

Also, even when the line winding diameter of the spool 337 becomes large as the fishline 341 is taken up and, as a result the fishline 341 being guided to the line roller 331 is urged to move in the arrow B direction, the regulation portion 355 regulates the motion of the fishline 341 to thereby always position the fishline 341 in the central portion of the line roller 331.

Furthermore, since the line roller 331 employed in the present embodiment is formed with a taper, such that it increases in diameter toward the fishline take-up direction of the rotor 321, the friction of the line roller 331 with respect to the fishline 341 is stronger on the large diameter side of the fishline guide portion 331a of the line roller 331. For this reason, as the fishline 341 is taken up, a line twist is produced in the fishline 341 that extends in the direction opposite to a line twist which is produced when the fishline 341 is cast. The thus produced line twist of the fishline 341 is canceled by the line twist produced in the fishline 341 in the casting operation.

As described above, in the fishline guide operation, the flange portion 351 prevents the fishline 341 from entering between the line slider 329 and line roller 331. When the fishline 341 is taken up, the regulation portion 355 regulates the motion of the fishline 341 in the arrow B direction and always holds the fishline 341 at the central position of the line roller 331 regardless of variations in the line winding diameter of the fishline to thereby prevent the fishline 341 from entering between the line roller 331 and arm lever 327. When compared with the conventional spinning reel for fishing, according to the present embodiment, the possibility of the fishline being cut or damaged is substantially eliminated, which makes it possible to take up the fishline 341 smoothly and thus improves the fishing operability of the present spinning reel for fishing.

Also, according to the present embodiment, since the fishline guide portion 331a of the line roller 331 is formed in a tapered shape so that it sequentially increases in diameter toward the fishline take-up direction of the rotor 321, in the take-up operation of the fishline 341, a line twist can be produced in the fishline 341 that operates in the opposite direction to a line twist which is produced in the casting operation. Therefore, the present embodiment, counteracts the tendency of line twists to accumulate on the fishline 341 when the fishline 341 is repeatedly played out and taken up. This in turn avoids the danger that the fishline 341 can be cut due to the accumulation of the line twists over a long period, which improves the practical use of the spinning reel for fishing.

Figure 29:
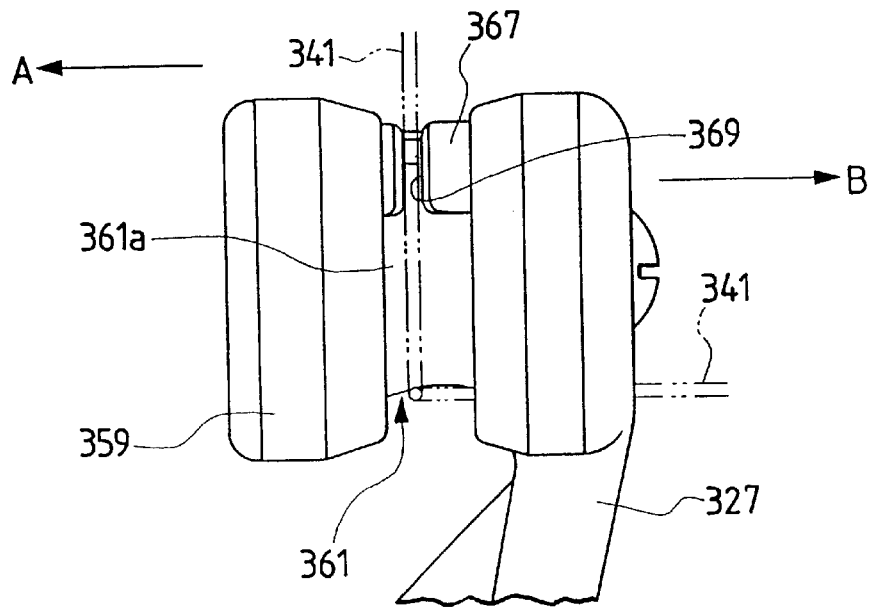
FIG. 29 is a side view of main portions of a twelfth embodiment of the invention.

FIG. 29 shows a twelfth embodiment of a spinning reel for fishing according to the invention. In the abovementioned eleventh embodiment, the regulation member 353 is formed separately from the arm lever 327 and line slider 329 and is interposed between the arm lever 327 and line slider 329. On the other hand, in accordance with the twelfth embodiment, a regulation member is formed integral with a line slider, and a line roller is formed in a constricted drum shape.

Description will be given below of the twelfth embodiment with reference to the accompanying drawings, while the same parts as those in the eleventh embodiment are given the same designation and the description thereof is omitted here.

Figure 30:
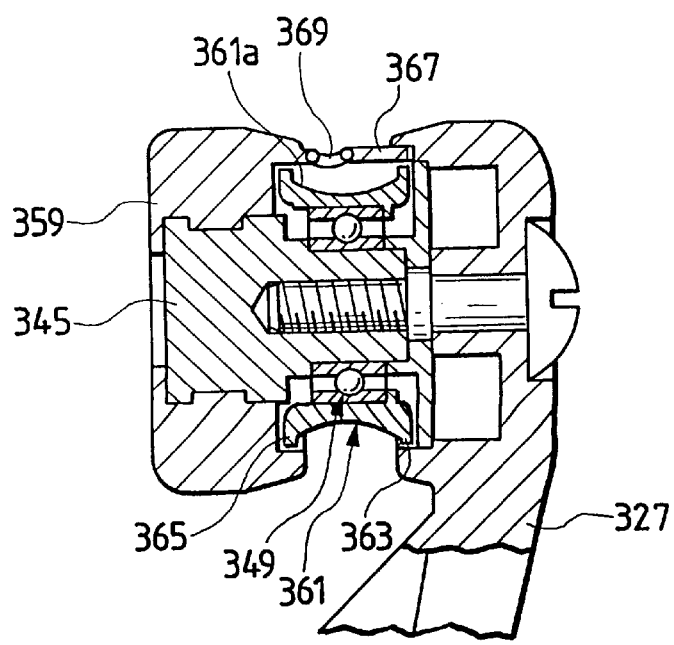
FIG. 30 is a sectional view of the main portions of the twelfth embodiment.

In FIG. 29, reference character 359 designates a line slider which is disposed opposed to the arm lever 327. As shown in FIG. 30, the line slider 359 is also bolted to the arm lever 327 through the bearing metal 345. A line roller 361 is rotatably supported between the arm lever 327 and line slider 359 through a ball bearing 349 mounted on the outer periphery of the bearing metal 345.

The line roller 361, formed into a constricted drum shape, includes flange portions 363 and 365 which are respectively formed integral with peripheral edge portions of the line roller 361 near to the arm lever 327 and the line slider 359. The two flange portions 363 and 365 prevent the fishline 341 from twining between the arm lever 327 or line slider 359 and the line roller 361.

Also, in FIGS. 29 and 30, reference character 367 indicates a regulation member which is provided between the arm lever 327 and line slider 359. Similarly to the previously described regulation member 353 the regulation member 367 is constructed by means of a plate member, but is formed integral with the line slider 359.

The regulation member 367 includes a regulation portion 369 in the form of a slit cut out to extend along the outer periphery of the line roller 361 and also opened to permit the fishline 341 to extend therethrough to the line roller 361 when the fishline 341 is guided. In the present embodiment, as shown in FIG. 30, the regulation portion 369 is disposed at a shifted position near to the line slider 359 relative to the central portion of the regulation member 367. The regulation portion 369 is structured such that, when the fishline 341 is taken up, it regulates the motion of the fishline 341 to thereby hold the fishline 341 in the fishline guide portion 361a of the line roller 361, which fishline guide portion 361a is the portion extending from the central portion of the line roller 361 toward the line slider 359.

Since the present embodiment is structured in this manner, if the bail 333 is reversed from the fishline play-out condition to the fishline take-up condition, to thereby guide the fishline 341 to the line roller 361, then, as shown in FIG. 29, the fishline 341, which is guided from the rod top side to the line roller 361, is inserted through the regulation portion 369. Also in this fishline guide operation, the flange portion 365 prevents the fishline 341 from entering between the line slider 359 and line roller 361.

If the rotor 321 is rotated in a direction of an arrow A by operating a hand-operated handle 339, then the fishline 341, which is guided from the rod top to the line roller 361, seeks to move in an arrow B direction opposite to the fishline take-up direction of the rotor 321. However, the regulation portion 369 regulates such motion of the fishline 341 to thereby always hold the fishline 341 in the fishline guide portion 361a.

Also, even when the line winding diameter of the spool 337 becomes large as the take-up operation of the fishline 341 proceeds and the fishline 341 being guided by the line roller 361 thereby moves in the arrow B direction, the regulation portion 369 regulates such motion of the fishline 341. Additionally the flange portion 363 prevents the fishline 41 from twining between the line roller 361 and arm lever 327.

In addition, in the line roller 361 in the present embodiment as well, since the fishline guide portion 361a extending from the central portion of the line roller 361 toward the line slider 359 increased in diameter toward the fishline take-up direction of the rotor 321, the friction of the line roller 361 with respect to the fishline 341 is strong on the large diameter side of the fishline guide portion 361a. For this reason, as the fishline 341 is taken up, a line twist is produced in the fishline 341 which extends in the opposite direction to a line twist which is produced in the casting operation. The thus produced line twist of the fishline 341 cancels the line twist which is produced in the casting operation.

As described above, in accordance with the present embodiment as well, similarly to the previously described eleventh embodiment, the flange portions 363 and 365 prevent the fishline 41 from entering between the arm lever 327 or line slider 359 and the line roller 361. Additionally in the take-up operation of the fishline 341, the regulation portion 369 regulates the fishline 341 from moving in the arrow B direction and thereby always holds the fishline 341 at a given position on the line roller 361 regardless of variations in the line winding diameter of the fishline 341. This prevents the fishline 341 from becoming twined between the line roller 361 and arm lever 327. Therefore, when compared with the conventional spinning reel for fishing, according to the present embodiment, the fishline 341 can be taken up smoothly without being cut or damaged, thereby improving the fishing operability of the present spinning reel for fishing.

Besides, according to the present embodiment as well, as described above, in the take-up operation of the fishline 341, the line roller can produce a line twist in the fishline 341 which acts in the direction opposite to the line twist that is produced in the cast operation. This avoids the possibility that the line twists accumulate on the fishline 341 due to the repeated play-out and take-up operations of the fishline 341. This, in turn, eliminates the danger that the fishline 341 can be cut due to the line twists accumulated in the fishline 341 over a long period, which improves the practical use of the spinning reel for fishing as a result.

Figure 31:
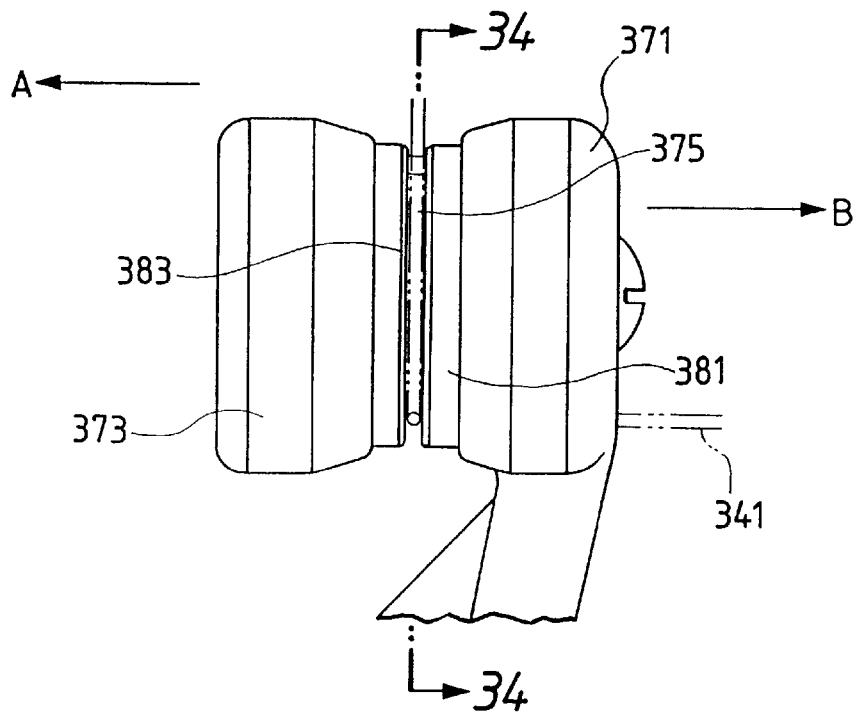
FIG. 31 is a side view of main portions of a thirteenth embodiment of the invention.

FIG. 31 shows yet another embodiment of a spinning reel for fishing according to the invention. In the present embodiment as well, the structure thereof is similar to the embodiment shown in FIG. 23 except for the inventive portion thereof. Thus description will be given here only of the inventive portion thereof, whereas the same parts as those in the embodiment shown in FIG. 23 are given the same designations and, therefore, the description thereof is omitted here.

Figure 32:
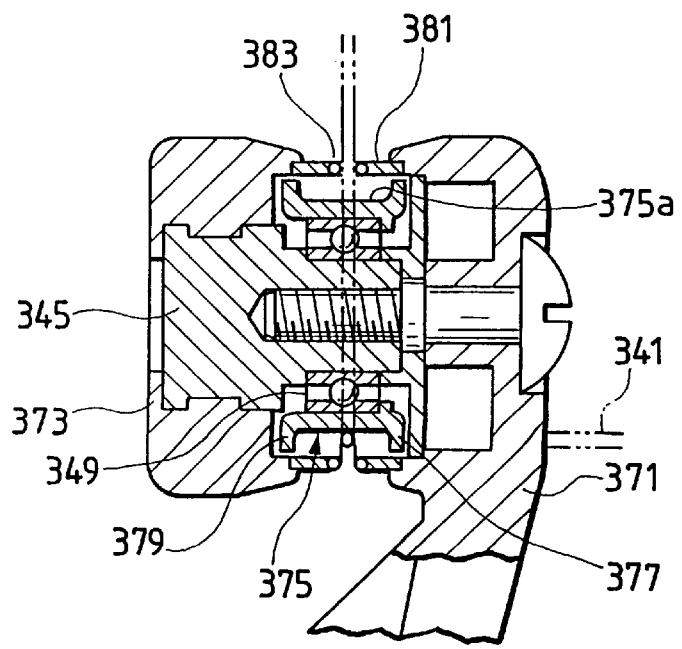
FIG. 32 is a sectional view of the main portions of the thirteenth embodiment.

In FIG. 31, reference character 371 designates an arm lever which is pivotably mounted on the leading end of the rotor support arm 325, while 373 designates a line slider. As shown in FIG. 32, the line slider 373 is also bolted to the arm lever 371 through the bearing metal 345.

By means of the ball bearing 349 mounted on the outer periphery of the bearing metal 345, a line roller 375 is rotatably supported between the arm lever 371 and line slider 373. The line roller 375 employed in the present embodiment is structured such that a fishline guide portion 375a thereof is formed in a straight shape except for flange portions 377 and 379 which are respectively formed in the two peripheral edge portions thereof. Also, there is provided a regulation member 381 between the arm lever 371 and line slider 373 in such a manner that the regulation member 381 is coaxial with the line roller 375.

Figure 33:
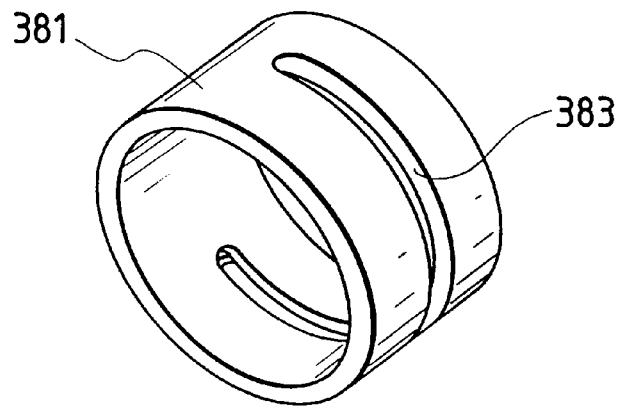
FIG. 33 is a perspective view of a regulation member provided for the thirteenth embodiment.

As shown in FIG. 33, the regulation member 381 is constructed by a cylindrical member which has an inside diameter larger than the outside diameter dimensions of the two flange portions 377 and 379. It also includes in the central portion of the peripheral wall thereof a regulation portion 383 in the form of a slit which extends along the outer periphery of the line roller 375.

Figure 34:
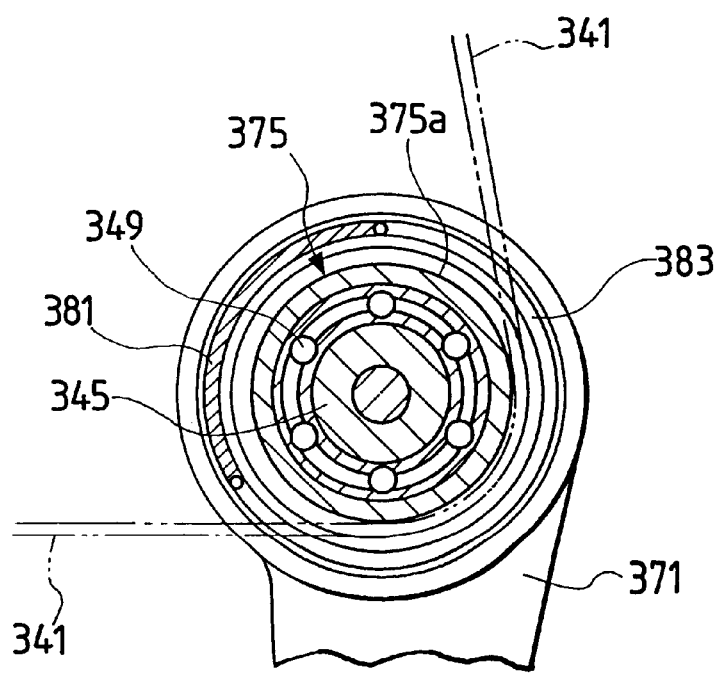
FIG. 34 is sectional view taken along line 34—34 of FIG. 31.

As shown in FIGS. 31 and 34, the regulation portion 383 is opened such that, when the fishline 341 is guided to the line roller 375, the fishline 341 enters the regulation portion 383. In the take-up operation of the fishline 341, as shown in FIG. 32, the regulation portion 383 the motion of the fishline 341 inserted through the regulation portion 383 to thereby position the fishline 341 in the central portion of the line roller 375.

Since the present embodiment is structured in this manner, if the bail 333 is reversed from the fishline play-out condition to the fishline take-up condition, to thereby guide the fishline 341 to the line roller 375, then, as shown in FIG. 34, the fishline 341 being guided from the rod top to the line roller 375 is inserted through the regulation portion 383. In this operation, the regulation member 381 prevents the fishline 341 from entering between the line slider 373 and line roller 375.

If the rotor 321 is rotated in a direction of an arrow A by operating the hand-operated handle 339, then the fishline 341 being guided from the rod top to the line roller 375 attempts to move in the arrow B direction opposite to the fishline take-up direction of the rotor 321. However, the regulation portion 383 regulates such motion of the fishline 341 to thereby always hold the fishline 341 at the central position of the line roller 375.

Also, even when the line winding diameter of the spool 337 becomes large as the take-up operation of the fishline 341 proceeds and the fishline 341 being guided to the line roller 375 is thereby urged to move in the arrow B direction, the regulation portion 383 regulates such motion of the fishline 341. At the same time, the movement of the fishline 341 extending from the line roller 375 to the spool 337 is also regulated by the regulation portion 383.

As described above, in accordance with the present embodiment as well, the regulation portion 383 regulates the motion of the fishline 341 in the arrow B direction during the take-up operation of the fishline 341. At the same time, the cylindrical regulation member 381 itself firmly prevents the fishline 41 from being twined between the line roller 375 and the arm lever 371 or the line slider 373. For this reason, when compared with the previously described embodiments, the present embodiment is advantageous is that it is even better able to prevent the fishline from being cut or damaged.

Figure 35:
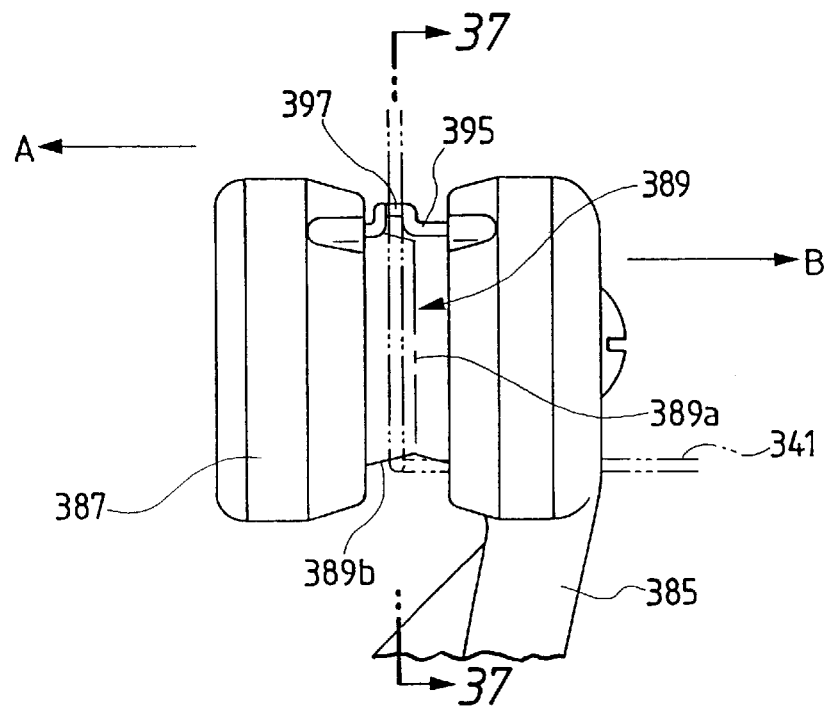
FIG. 35 is a side view of main portions of a fourteenth embodiment of the invention.
Figure 36:
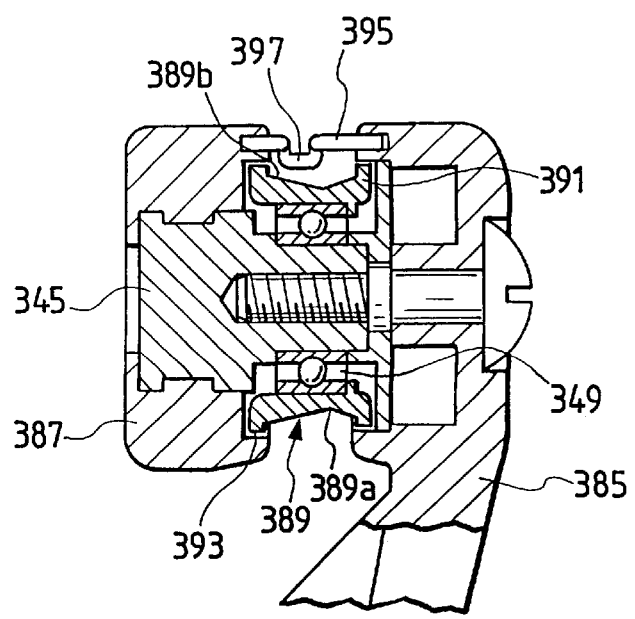
FIG. 36 is a sectional view of the main portions of the fourteenth embodiment.

FIG. 35 shows an embodiment of a spinning reel for fishing according to the invention. In FIG. 35, reference character 385 designates an arm lever, while 387 designates a line slider. As shown in FIG. 36, the line slider 387 is also bolted to an arm lever 385 through the bearing metal 345.

By means of the ball bearing 349 mounted on the outer periphery of the bearing metal 345, a line roller 389 is rotatably supported between the arm lever 385 and line slider 387. The line roller 389 employed in the present embodiment is formed substantially in a V-shape and includes on the two peripheral edge portions thereof flange portions 391 and 393 which are respectively formed integral therewith and are used to prevent the fishline 341 from becoming twined between the arm lever 385 and line slider 387.

Figure 37:
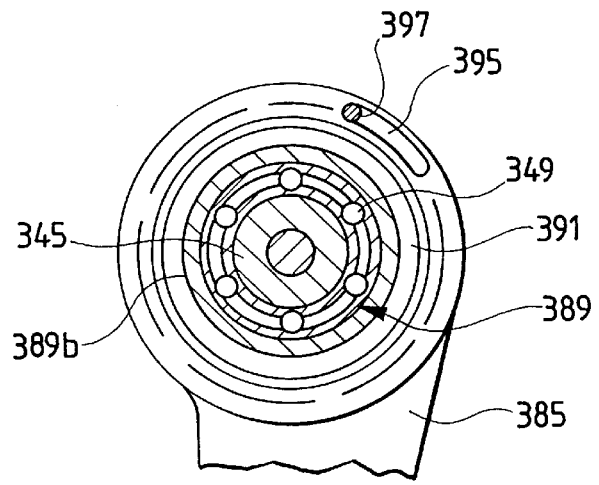
FIG. 37 is a sectional view taken along line 37—37 of FIG. 35.
Figure 38:
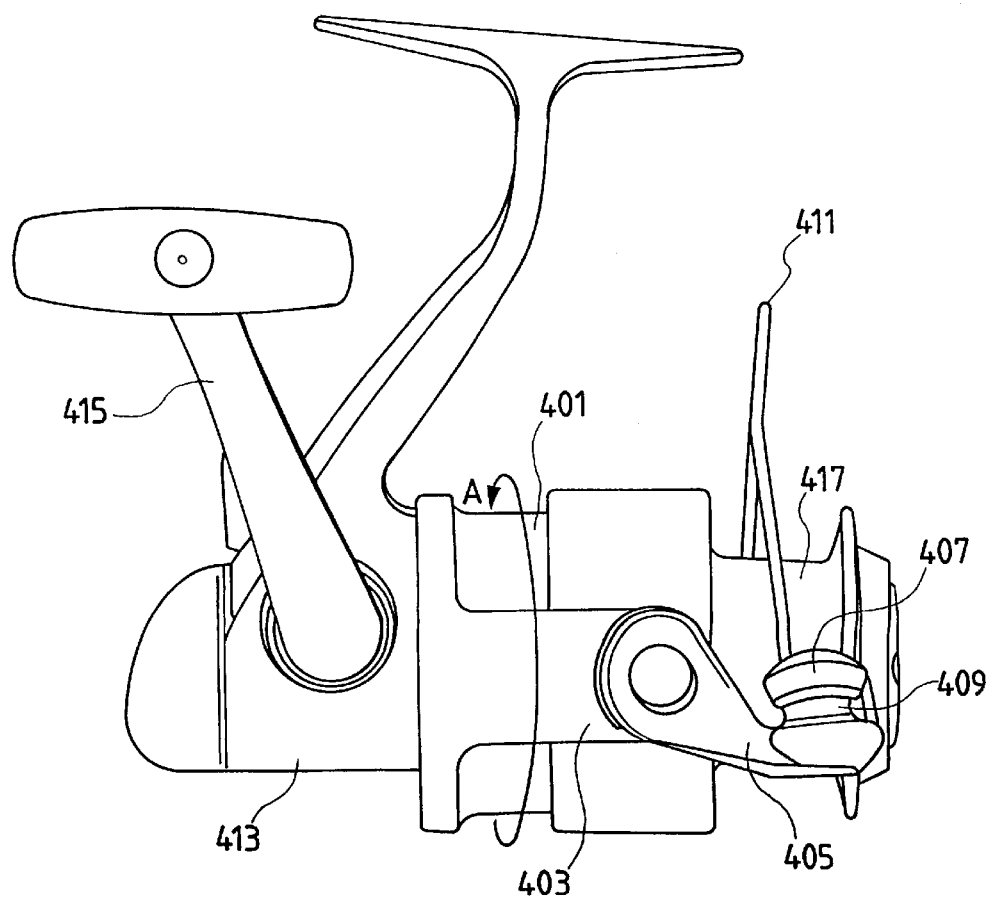
FIG. 38 is a side view of a conventional spinning reel for fishing.
Figure 39:
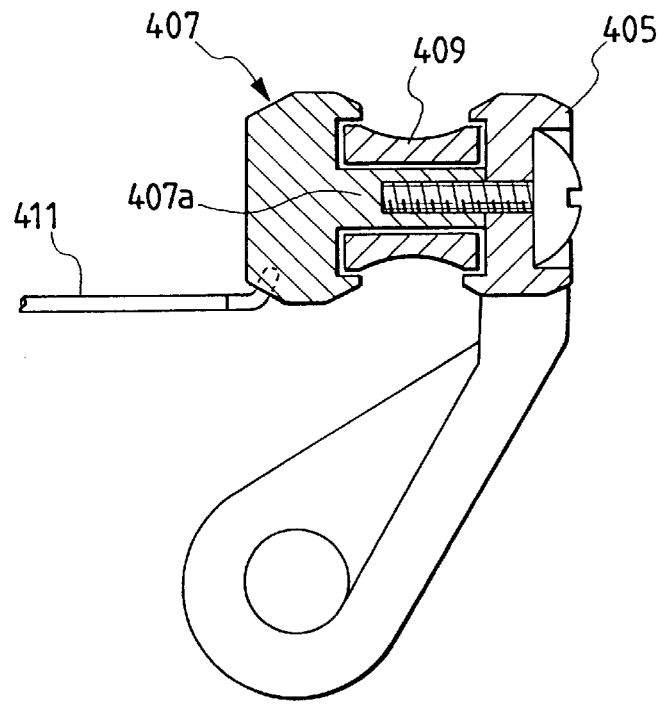
FIG. 39 is a partially sectional view showing a fishline guide arrangement provided in the spinning reel shown in FIG. 38.
Figure 40:
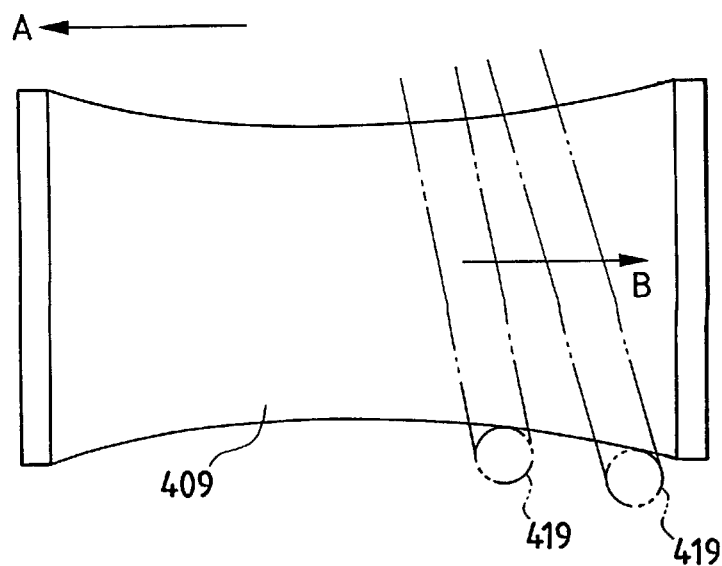
FIG. 40 is an explanatory view showing a state where a fishline is moved axially on a fishline guide roller during winding of the fishline.

Also, as shown in FIGS. 36 and 37, on the leading ends (i.e. the upper ends in FIGS. 36 and 37) of the arm lever 385 and line slider 387, there is provided a regulation member 395 which is formed of a rod member. The regulation member 395 includes a regulation portion 397 constructed as a bent portion which is bent substantially into a U-shape and extends along the outer periphery of the line roller 389. The regulation portion 397 defines an opening which permits the insertion of the fishline 341 when the fishline 341 is scooped up when the bail is placed in the fishline take-up condition. Also, the regulation portion 397 is situated in the middle between the arm lever 385 and line slider 387, and is structured such that, when the fishline 341 is taken up, it regulates the motion of the fishline to thereby hold the fishline 341 in a fishline guide portion 389b which extends from the central portion of the line roller 389 toward the line slider 387.

Since the present embodiment is structured in this manner, if the bail 333 is reversed from the fishline play-out condition, to the fishline take-up condition to thereby guide the fishline 341 to the line roller 389, then, as shown in FIG. 35, the fishline 341 being guided from the rod top to the line roller 389 can be inserted through the regulation portion 397. Additionally, in this operation, the flange portion 393 prevents the fishline 341 from twining between the line slider 387 and line roller 389.

If the rotor 321 is rotated in the arrow A direction by operating the hand-operated handle 339, then the fishline 341 being guided from the rod top to the line roller 389 is induced to move in the arrow B direction opposite to the fishline take-up direction of the rotor 321. However, the regulation portion 397 regulates such motion of the fishline 341 to thereby always hold the fishline 341 in the fishline guide portion 389b.

Also, even when the line winding diameter of the spool 337 becomes large as the fishline 341 is taken up and the fishline 341 being guided to the line roller 389 thereby is induced to move in the arrow B direction, the regulation portion 397 regulates such motion of the fishline 341. At the same time, the flange portion 391 prevents the fishline 341 from twining between the line roller 389 and arm lever 385.

Moreover, the line roller 389 employed in the present embodiment is also formed into a tapered shape that the fishline guide portion 389b thereof extending from the valley portion 389a toward the line slider 387 continuously increases in diameter toward the fishline take-up direction of the rotor 321. Therefore, the friction of the line roller 389 with respect to the fishline 341 is strong on the large diameter side of the fishline guide portion 389b. Due to this, as the fishline 341 is taken up, a line twist is produced in the fishline 341 in the direction opposite a line to twist produced in the casting operation. The thus produced line twist in the fishline 341 largely cancels the line twist that is produced in the casting operation.

As described above, in accordance with the present embodiment as well, the flange portions 391 and 393 prevent the fishline 341 from becoming twined between the arm lever 385 or line slider 387 and the line roller 389. Furthermore, the regulation portion 397 always holds the fishline 341 at a given position of the line roller 389 regardless of variations in the line winding diameter of the fishline 341. Thanks to this, when compared with the conventional spinning reel for fishing, according to the present embodiment, the danger that the fishline can be cut or damaged is largely eliminated, which makes it possible to take up the fishline 341 smoothly and improves the fishing operability of the spinning reel for fishing as a result.

Besides, as described above, according to the present embodiment, when the fishline 341 is taken up, a line twist is produced in the fishline 341 extending in the opposite direction to the line twist that is produced in the casting operation. This counteractive twist eliminates the possibility that line twists can accumulate on the fishline 341 due to repeated play-out and take-up operations of the fishline 341. As a result the danger that the fishline 341 can be cut because of the line twists accumulated in the fishline 341 over a long period is avoided. This, in turn, further improves the practical use of the spinning reel for fishing.

Here, as in the above-mentioned respective embodiments, the spinning reel for fishing includes a bail, and a line slider of the above-mentioned type is used as means for holding a line roller. Conventionally, however, various kinds of spinning reels for fishing have been proposed which do not include a bail.

In such conventional spinning reels for fishing, an line roller is supported through the arm lever and a hold means instead of the line slider. The present invention can also be applied to spinning reels for fishing having such structure i.e., to spinning reels that do not include bails.

Also, in the above-mentioned respective embodiments, the present invention is applied to a spinning reel for fishing of a type in which the line roller is rotatably supported between the arm lever and the line slider through ball bearing. However, of course, the present invention can also be applied to a spinning reel for fishing of a type in which line roller is fixed between an arm lever and a line slider.

What is claimed is:

1. A fishline guide arrangement for guiding a fishline, said fishline guide arrangement comprising:

a bail support member; and a fishline guide roller supported by said bail support member and having an axis and a first axial length (L) defined between opposite axial terminuses of said fishline guide roller, said fishline guide roller having an annular groove for receiving a fishline therein and restricting axial movement of the fishline along said fishline guide roller, the annular groove having a second axial length (l), wherein a ratio (l/L) of the second axial length relative to the first axial length is set within a range of 0.05–0.35, wherein the annular groove is defined in part by a bottom surface that is conical.

2. A fishline guide arrangement according to claim 1, wherein said fishline guide roller includes:

a pair of cylindrical surfaces distanced from each other in a direction of the axis and each concentric to the axis; and a pair of wall surfaces connecting said bottom surface respectively to said cylindrical surfaces;

wherein said annular groove is defined by said bottom surface and said wall surfaces.

3. A fishline guide arrangement according to claim 1, wherein:

said bail support member supports a bail; and said bottom surface tapers from a larger diameter terminus more proximate to the bail to a smaller diameter terminus less proximate to the bail.

4. A fishline guide arrangement according to claim 1, wherein:

said bail support member is arranged to support a bail;

the annular groove is further defined by a first wall surface on a bail side of said bottom surface and a second wall surface on a side of said bottom surface opposite the bail side; and said first wall surface defines a slope angle, relative to the axis of said fishline guide roller, that is less than a slope angle of said second wall surface relative to the axis of said fishline guide roller.

5. A fishline guide arrangement according to claim 1, wherein:

the annular groove of said fishline guide roller substantially prevents said fishline from moving axially along said fishline guide roller.

6. A fishline guide arrangement for guiding a fishline, said fishline guide arrangement comprising:

a bail support member; and a fishline guide roller supported by said bail support member and having an axis and a first axial length (L) defined between opposite axial terminuses of said fishline guide roller, said fishline guide roller having an annular groove for receiving a fishline therein and restricting axial movement of the fishline along said fishline guide roller, the annular groove having a second axial length (l), wherein a ratio (l/L) of the second axial length relative to the first axial length is set within a range of 0.05–0.35, wherein the annular groove has an asymmetrical shape as viewed in a plane containing the axis, wherein the annular groove is defined by a wall surface orthogonal to the axis, a conical surface concentric to the axis, and a bottom surface extending between said wall surface and said conical surface, and wherein said bottom surface is conical.

7. A fishline guide arrangement for guiding a fishline, said fishline guide arrangement comprising:

a bail support member; and a fishline guide roller supported by said bail support member and having an axis, an axial length (L) defined between opposite axial terminuses of said fishline guide roller, and a maximum diameter (D), wherein a ratio (L/D) of the axial length relative to the maximum diameter is set within a range of 0.10–0.40.

8. A fishline guide arrangement according to claim 7, wherein said fishline guide roller has an annular groove for receiving the fishline therein and restricting axial movement of the fishline along said fishline guide roller.

9. A fishline guide arrangement for guiding a fishline, said fishline guide arrangement comprising:

a bail support member; and a fishline guide roller supported by said bail support member and having an axis, said fishline guide roller having an annular groove for receiving a fishline therein and restricting axial movement of the fishline along said fishline guide roller, wherein the annular groove is defined at least partly by a bottom surface and by a pair of wall surfaces each extending away from said bottom surface, and wherein the annular groove has an asymmetrical shape as viewed in a plane containing the axis.

10. A fishline guide arrangement according to claim 9, wherein:

said bail support member supports a bail; and said bottom surface tapers from a larger diameter terminus more proximate to the bail to a smaller diameter terminus less proximate to the bail.

11. A fishline guide arrangement according to claim 9, wherein:

said bail support member is arranged to support a bail;

a first of said wall surfaces on a bail side of said bottom surface defines a first slope angle, relative to the axis of said fishline guide roller;

a second of said wall surfaces on a bail side of said bottom surface defines a second slope angle, relative to the axis of said fishline guide roller; and the first slope angle is less than the second slope angle.

12. A fishline guide arrangement according to claim 9, wherein said fishline guide roller includes:

a pair of cylindrical surfaces distanced from each other in a direction of the axis and each concentric to the axis;

a bottom surface located between said cylindrical surfaces;

a pair of wall surfaces connecting said bottom surface to respectively to said cylindrical surfaces; and wherein said annular groove is defined by said bottom surface and said wall surfaces.

13. A fishline guide arrangement according to claim 9, wherein:

the annular groove of said fishline guide roller substantially prevents said fishline from moving axially along said fishline guide roller.

14. A fishline guide arrangement for guiding a fishline, said fishline guide arrangement comprising:

a fishline guide roller having a rotational axis and an axial roller width ($W_R$) defined between opposite axial terminuses of said fishline guide roller; wherein said fishline guide roller has a circumferential groove for restricting axial movement of the fishline along said fishline guide roller;

the circumferential groove has an axial groove width ($W_g$) and a radial groove depth sufficient for receiving the fishline;

a ratio ($W_g/W_R$) of the axial groove width relative to the axial roller width is within a range of substantially 0.05–0.35;

the circumferential groove has an asymmetrical shape as viewed in a plane containing the axis;

the circumferential groove is bounded at least partly by a first wall surface, a bottom surface and a second wall surface;

said first and second wall surfaces extend from respective first and second inner boundaries, respectively contacting said bottom surface, outwardly, with respect to the axis, to respective first and second outer boundaries, such that the first and second inner boundaries each has a radius, measured from the axis, that is smaller than radii, measured from the axis, of the first and second outer boundaries.

15. A fishline guide arrangement according to claim 14, wherein:

a minimum linear distance from the first outer boundary to the second outer boundary is greater than a minimum linear distance from the first inner boundary to the second inner boundary.

16. A fishline guide arrangement according to claim 14, wherein:

the radius of the first inner boundary is greater than the radius of the second inner boundary.

17. A fishline guide arrangement according to claim 16, wherein:

radii of said bottom surface decrease gradually in length from the first inner boundary to the second inner boundary.

18. A fishline guide arrangement according to claim 16, wherein:

radii of said bottom surface decrease linearly in length from the first inner boundary to the second inner boundary.

19. A fishline guide arrangement according to claim 14, wherein:

a projection of the second inner boundary orthogonally onto the axis coincides with a projection of the second outer boundary onto the axis.

20. A fishline guide arrangement according to claim 14, wherein:

a projection of the second inner boundary orthogonally onto the axis defines a point of reference, and a projection of the first inner boundary orthogonally onto the axis lies between a projection of the first outer boundary onto the axis and the point of reference.

21. A fishline guide arrangement according to claim 14, further comprising:

a line slider positioned on the rotational axis on a first side of said fishline guide roller; and a bail support member positioned on the rotational axis on a second side of said fishline guide roller;

wherein the first inner and outer boundaries are more proximate to the first side than are the second inner and outer boundaries.

22. A fishline guide arrangement for guiding a fishline, said fishline guide arrangement comprising:

a fishline guide roller having a rotational axis, an axial roller width ($W_R$) defined between opposite axial tenninuses of said fishline guide roller, and a maximum roller diameter ($D_R$); wherein:

a ratio ($W_R/D_R$) of the axial roller width relative to the maximum roller diameter is within a range of substantially 0.10–0.40;

said fishline guide roller has a circumferential groove for restricting axial movement of the fishline along said fishline guide roller;

the circumferential groove has an axial groove width and a radial groove depth sufficient for receiving the fishline; and the circumferential groove has an asymmetrical shape as viewed in a plane containing the axis.

* * * * *